United States Patent
Robbins et al.

(10) Patent No.: US 12,472,446 B2
(45) Date of Patent: Nov. 18, 2025

(54) SEPARATION OF MINERALS BY GAS INJECTION

(71) Applicant: GOOD EARTH IP HOLDINGS, LLC, Peoria, AZ (US)

(72) Inventors: Jody G. Robbins, Phoenix, AZ (US); Luke Seed, Cardiff, CA (US); Leonard Fraitag, San Diego, CA (US); Jaime Cohen, Scottsdale, AZ (US)

(73) Assignee: GOOD EARTH IP HOLDINGS, LLC, Peoria, AZ (US)

( * ) Notice: Subject to any disclaimer, the term of this patent is extended or adjusted under 35 U.S.C. 154(b) by 0 days.

(21) Appl. No.: 18/516,156

(22) Filed: Nov. 21, 2023

(65) Prior Publication Data

US 2024/0165537 A1    May 23, 2024

Related U.S. Application Data

(60) Provisional application No. 63/384,938, filed on Nov. 23, 2022.

(51) Int. Cl.

| B01D 9/00 | (2006.01) |
|---|---|
| B01D 61/02 | (2006.01) |
| B01D 61/08 | (2006.01) |
| B03B 9/06 | (2006.01) |
| B03C 1/30 | (2006.01) |
| B03C 7/00 | (2006.01) |
| B03C 7/02 | (2006.01) |
| C01D 15/08 | (2006.01) |

(52) U.S. Cl.
CPC ............ B01D 9/005 (2013.01); B01D 9/0081 (2013.01); B01D 61/025 (2013.01); B01D 61/08 (2013.01); B03B 9/06 (2013.01); B03C 1/30 (2013.01); B03C 7/003 (2013.01); B03C 7/02 (2013.01); C01D 15/08 (2013.01); *B01D 2009/0086* (2013.01); *B03B 2009/066* (2013.01); *B03C 2201/20* (2013.01)

(58) Field of Classification Search
CPC ........ B01D 9/00; B01D 9/005; B01D 9/0081; B01D 61/025; B01D 61/08; B01D 2009/0086; B03B 9/06; B03B 2009/066; B03C 1/30; B03C 7/003; B03C 7/02; B03C 2201/20; C01D 15/08
USPC ...................................................... 423/179.5
See application file for complete search history.

(56) References Cited

U.S. PATENT DOCUMENTS

| 2,071,260 | A | 2/1937 | Holden |
|---|---|---|---|
| 3,076,547 | A | 2/1963 | Bodine, Jr. |
| 3,327,401 | A | 6/1967 | Stamos et al. |
| 3,957,650 | A | 5/1976 | Petrushkin et al. |
| 4,401,437 | A | 8/1983 | Poetschke |
| 4,523,682 | A | 6/1985 | Barmatz et al. |
| 4,529,506 | A | 7/1985 | Smit |
| 4,556,467 | A | 12/1985 | Kuhn et al. |
| 4,772,255 | A | 9/1988 | Csillag et al. |
| 4,799,920 | A | 1/1989 | Mozley |
| 4,824,431 | A | 4/1989 | McAlister |
| 5,562,823 | A | 10/1996 | Reeves |
| 5,577,669 | A | 11/1996 | Vujnovic |
| 6,217,770 | B1 * | 4/2001 | Haney ............ B01D 61/145 |
|  |  |  | 210/791 |
| 9,302,270 | B2 | 4/2016 | Rothman et al. |
| 10,888,877 | B2 | 1/2021 | Robbins et al. |
| 11,267,000 | B2 | 3/2022 | Robbins et al. |
| 2003/0056584 | A1 | 3/2003 | Park |
| 2010/0000444 | A1 | 1/2010 | Constantz et al. |
| 2012/0145633 | A1 | 6/2012 | Polizzotti et al. |
| 2013/0252796 | A1 | 9/2013 | Von Stetten et al. |
| 2017/0114599 | A1 | 4/2017 | Amaravadi et al. |
| 2017/0173597 | A1 | 6/2017 | Feraud et al. |
| 2017/0361270 | A1 | 12/2017 | Constantz et al. |
| 2019/0329270 | A1 | 10/2019 | Robbins et al. |
| 2019/0388906 | A1 | 12/2019 | Robbins et al. |
| 2021/0207243 | A1 | 7/2021 | Sun et al. |
| 2022/0395842 | A1 | 12/2022 | Robbins et al. |

FOREIGN PATENT DOCUMENTS

| CA | 3017528 A1 | 9/2017 |
|---|---|---|
| CN | 2040002 U | 6/1989 |
| CN | 1515881 A | 7/2004 |

(Continued)

OTHER PUBLICATIONS

"10-15 Ton/Hr Fine Gold Concentrator," product description available at http://www.911metallurgist.com/equipment/recover-gold-without-chemicals/, printed Apr. 2, 2019, 10 pages.

"Centrifugal Separators for Industrial Applications," Gruppo Pieralisi brochure, 8 pages, available at http://www.pieralisi.com/media/files/143_114_centrifugal_separators.pdf (2018).

(Continued)

*Primary Examiner* — Anthony J Zimmer
*Assistant Examiner* — Annette Phan
(74) *Attorney, Agent, or Firm* — Knobbe, Martens, Olson & Bear, LLP

(57) ABSTRACT

A system for separating a mineral from a clay using a gas injection module includes a solution tank configured to receive a supersaturated solution including at least one mineral. The system also includes a gas injection module in fluid communication with the solution tank and configured to receive at least a portion of the supersaturated solution. The system includes at least one gas injection port in fluid communication with a source of gas and the gas injection module. The gas injection port is configured to inject a gas to the supersaturated solution. During operation of the system, the gas causes at least a portion of the supersaturated solution to crystallize.

18 Claims, 29 Drawing Sheets

(56) References Cited

FOREIGN PATENT DOCUMENTS

| | | | |
|---|---|---|---|
| CN | 1812842 | A | 8/2006 |
| CN | 102091669 | A | 6/2011 |
| CN | 102198423 | A | 9/2011 |
| CN | 102933280 | A | 2/2013 |
| CN | 104115026 | A | 10/2014 |
| CN | 205323290 | U | 6/2016 |
| CN | 112135677 | B | 4/2023 |
| CN | 116251658 | A | 6/2023 |
| DE | 766 260 | C | 5/1954 |
| DE | 4124212 | C1 | 1/1993 |
| EP | 3758824 | A2 | 1/2021 |
| GB | 2 177 948 | A | 2/1987 |
| JP | 2021-519688 | | 8/2021 |
| JP | 7364590 | B2 | 10/2023 |
| KR | 10-2020-0138816 | | 12/2020 |
| KR | 10-2700576 | B1 | 8/2024 |
| WO | WO 1995/27551 | A1 | 10/1995 |
| WO | WO 2017143450 | A1 | 8/2017 |
| WO | WO 2019/195475 | A2 | 10/2019 |
| WO | WO 2024/112811 | A2 | 5/2024 |

OTHER PUBLICATIONS

"Centrifugal Ultrasonic Reactor for Separation," Hielscher brochure, https://www.hielscher.com/centrifugal-ultrasonic-reactor-for-separation.htm, printed Mar. 14, 2018, 2 pages.

Bakx, Kyle, "New titanium industry could grow out of oilsands waste," CBC News, posted Mar. 21, 2018, http://www.cbc.ca/news/business/titanium-oilsands-cnrl-titaniumcorp-1.4584513, printed Mar. 23, 2018, 3 pages.

Falconer, Andrew, "Gravity separation: Old techniques/new methods," Physical Separation in Science and Engineering, 2003, vol. 12, No. 11, pp. 31-48.

Greguss, P., "Some effects of combined ultrasonic fields and centrifugal forces," Ultrasonics, Jan. 1971, vol. 9, Issue 1, pp. 10-13.

International Preliminary Report on Patentability in PCT/US2019/025660, in 9 pages, dated Oct. 6, 2020.

International Search Report and Written Opinion for International Application No. PCT/US2019/025660, mailed on Oct. 24, 2019 in 20 pages.

Marinelli, J. et al., "Panel Discussion: Mixing, Sampling & Segregation," International Powder & Bulk Solids Conference and Exhibition, Apr. 24-26, 2018, Donald E. Stephens Convention Center, Rosemont, IL, Session date: Thursday, Apr. 26, 2018, 9:00am-10:00am, title page.

Marinelli, J. et al., "Volumetric & Gravimetric Feeder Design to Ensure Reliable Flow," International Powder & Bulk Solids Conference and Exhibition, Apr. 24-26, 2018, Donald E. Stephens Convention Center, Rosemont, IL, Session date: Wednesday, Apr. 25, 2018, 3:15pm-4:45pm, title page.

Office Action issued for U.S. Appl. No. 16/552,861, mailed on Apr. 30, 2020 in 14 pages.

Office Action Received in Chinese Patent Application No. 201980030363.0, in 9 pages, dated Oct. 20, 2021.

Supplementary European Search Report EP19781454, in 50 pages, dated Oct. 20, 2021.

Tate, Karl, "International Space Station's Cooling System: How It Works (Infographic)," Space.com, May 10, 2013, https://www.space.com/21059-space-station-cooling-system-explained-infographic.html, printed Apr. 2, 2019, 5 pages.

Zhu, Z. et al., "Ultrasound-assisted extraction, centrifugation and ultrafiltration: Multistage process for polyphenol recovery from purple sweet potatoes," Molecules, 2016, vol. 21, 1584, 13 pages.

International Search Report and Written Opinion for International Application No. PCT/US23/80780, mailed on May 28, 2024 in 43 pages.

Jiang. "Toward CO2 utilization: Gas-liquid reactive crystallization of lithium carbonate in concentrated KOH solution" Energy Sources, Part A: Recovery, Utilization, and Environmental Effects. Web. Mar. 5, 2019; vol. 43, No. 24, pp. 3332-3344.

Kim. "Carbon dioxide utilization in lithium carbonate precipitation: A short review" pp. 1-13. Environ. Eng. Res., Online 2024; vol. 29, Article 3; pp. 1-13.

Notice of Allowance received in Japanese Patent Application No. 2020-554485, dated Sep. 5, 2023 in 5 pages.

Notice of Allowance received in Korean Patent Application No. 10-2020-7031795, dated May 26, 2024 in 4 pages.

Office Action received in Japanese Patent Application No. 2020-554485, dated Mar. 7, 2023 in 6 pages.

Office Action received in Korean Patent Application No. 10-2020-7031795, dated Jun. 28, 2023 in 9 pages.

Office Action received in Mexican Patent Application No. MX/a/2020/010385, dated Sep. 4, 2024 in 3 pages.

* cited by examiner

SEPARATION OF MINERALS BY GAS INJECTION

CROSS-REFERENCE TO RELATED APPLICATIONS

This application claims priority to U.S. Prov. App. No. 63/384,938, which is titled "SEPARATION OF MINERALS BY GAS INJECTION" and was filed on Nov. 23, 2022. The above-recited application is incorporated herein by reference in its entirety.

FIELD

The present disclosure relates to systems and methods for separating a mineral from a slurry using a gas injection module.

BACKGROUND

As more consumer and industrial products and devices adopt batteries as an alternative to fossil fuel powered engines, the number of batteries and products containing batteries will increase exponentially. As batteries degrade or reach the end of their useful life, it may be desirable to extract and reuse at least some of the minerals contained therein. For instance, batteries can contain copper, cobalt, nickel, aluminum, graphite, and/or magnesium. Current battery recycling methods can be inefficient at recovering all minerals contained in a battery. Further, removing batteries from other components of, for example, consumer products, can be expensive and inefficient. Battery recycling can also be harmful to the environment.

It is often desirable to extract particular materials, such as heavy metals, from their surrounding materials, but the desired materials can be present in low concentrations relative to the surrounding materials and therefore difficult to extract. For example, mining operations generate streams of mixed materials, from which desired materials are concentrated and extracted. Mining operations, however, generally fail to extract all of the desired materials, due to the limitations of technologies for concentrating and extracting specific materials from the mixed material streams produced by mines. Many historic mines also utilized inferior extraction technologies, thus leaving tailings containing significant quantities of valuable materials. Additionally, historic mines produced tailings with a large quantity of materials, such as rare earth metals, that were not be extracted during operation of the mine, due to technological or economic factors (e.g., the cost of extracting such materials may have greater than the value of recoverable materials given the technology available at the time). Modern mining operations are also constantly seeking cheaper and more efficient technologies for recovering desired materials. Similarly, industrial processes can produce waste that includes harmful elements that should be extracted for environmental, regulatory or safety reasons.

The present disclosure relates to systems and methods for recovering low concentration target materials, such as heavy metals, from a clay.

SUMMARY OF THE INVENTION

Various examples of methods and apparatus for recovering target materials from a clay are disclosed. Without limiting the scope of the claims, some prominent features of this disclosure will now be briefly described.

In some aspects, the techniques described herein relate to a system for separating a mineral from a clay using a gas injection module, the system including: a solution tank configured to receive a supersaturated solution including at least one mineral; a gas injection module in fluid communication with the solution tank and configured to receive at least a portion of the supersaturated solution; and at least one gas injection port in fluid communication with a source of gas and the gas injection module and configured to inject a gas to the supersaturated solution; wherein, during operation of the system, the gas causes at least a portion of the supersaturated solution to crystallize.

In some aspects, the techniques described herein relate to a system, further including an osmosis system configured to remove at least one of metal ions and aqueous salts from a non-crystallized portion of the supersaturated solution.

In some aspects, the techniques described herein relate to a system, wherein the at least one mineral of the supersaturated solution includes a Lithium.

In some aspects, the techniques described herein relate to a system, further including a system for creating the supersaturated solution, the system including: a container configured to receive a clay containing the at least one mineral and a first fluid, wherein the clay and the first fluid are mixed to create a slurry; and a separator configured to receive the slurry and apply at least one of a centrifugal force, variable pitch acoustic induction, and injection of air to separate the at least one mineral from the slurry; wherein the separated mineral is mixed with a second fluid to create the supersaturated solution.

In some aspects, the techniques described herein relate to a system, wherein: the clay includes a raw Zeolite clay containing lithium; the first and second solutions include water; and the supersaturated solution includes about 45 g of lithium for about every 5.67 liters of the second fluid.

In some aspects, the techniques described herein relate to a system, further including a recirculation line in fluid communication with the gas injection module and the at least one injection port, the recirculation line configured to recirculate at least a portion of the gas from inside the gas injection module to the at least one injection port.

In some aspects, the techniques described herein relate to a system, wherein a crystallized portion of the supersaturated solution includes lithium carbonate ($Li_2CO_3$).

In some aspects, the techniques described herein relate to a system, further including at least one of a pH indicator and a pH meter to verify a pH level of the supersaturated solution.

In some aspects, the techniques described herein relate to a system, further including a collection region disposed inside the gas injection module and configured to collect a crystallized portion of the supersaturated solution.

In some aspects, the techniques described herein relate to a system, wherein the gas includes at least one of carbon dioxide ($CO_2$) and compressed air.

In some aspects, the techniques described herein relate to a method of separating at least one mineral from a clay using a gas injection module, the method including: obtaining a clay including the at least one mineral; crushing the clay to create a powder clay; mixing the powder clay with a first fluid to create a slurry; receiving the slurry in a separator and using at least one of a centrifugal force, variable pitch acoustic induction, and injection of air to separate the at least one mineral from the slurry; mixing the separated mineral with a second fluid to create a supersaturated solution; and receiving the supersaturated solution in the gas injection module and injecting the supersaturated solution with a gas to crystallize at least a portion of the at least one mineral.

In some aspects, the techniques described herein relate to a method, wherein obtaining the clay including the at least one mineral includes obtaining a raw Zeolite clay including Lithium.

In some aspects, the techniques described herein relate to a method, further including verifying a pH level of the supersaturated solution.

In some aspects, the techniques described herein relate to a method, further including: filtering the crystallized mineral; collecting the crystallized mineral in a collection region; and processing a non-crystallized portion of the supersaturated solution using reverse osmosis.

In some aspects, the techniques described herein relate to a method, wherein injecting the supersaturated solution with the gas includes injecting the supersaturated solution with at least one of carbon dioxide ($CO2$) and compressed air.

In some aspects, the techniques described herein relate to a method, further including recirculating at least a portion of the gas inside the separation module.

In some aspects, the techniques described herein relate to a method, wherein the supersaturated solution includes about 45 g of lithium for about every 5.67 liters of the second fluid.

In some aspects, the techniques described herein relate to a method, further including the step of agitating the powder clay using a spinning magnet.

In some aspects, the techniques described herein relate to a method, further including the step of recirculating at least a portion of the first fluid through a water purifier.

In some aspects, the techniques described herein relate to a method, further including collecting a crystallized portion of the supersaturated solution in a collection region of the gas injection module.

In some aspects, the techniques described herein relate to a system for separating minerals, the system including: a shredder configured to receive and shred a material; a first crusher configured to receive the shredded material from the shredder and crush the shredded material; a magnetic separator configured to separate ferreous materials from non-ferrous materials contained in the crushed materials; a second crusher configured to receive the non-ferrous materials and crush the non-ferrous materials; an electrostatic separator configured to receive the materials from the second crusher and separate the materials by a first electrical charge and a second electrical charge; and a vibrating screen configured to receive the separated materials from the electrostatic separator and apply vibration to classify the separated materials by a particle size.

In some aspects, the techniques described herein relate to a system, wherein the material contains at least one of nickel, manganese, cobalt, and lithium.

In some aspects, the techniques described herein relate to a system, further including an air separator and a dust removal system, wherein the air separator is configured to remove air from the material, and wherein the dust removal system is configured to collect particulate matter from the air separated by the air separator.

In some aspects, the techniques described herein relate to a system, further including a centrifuge, the centrifuge configured to receive the ferreous materials and separate the ferreous materials according to specific gravity.

In some aspects, the techniques described herein relate to a system, further including a centrifuge, the centrifuge configured to receive an output of the vibrating screen and separate the output according to specific gravity.

In some aspects, the techniques described herein relate to a system for separating minerals, the system including: a shredder configured to receive and shred a material; a crusher configured to receive the shredded material from the shredder and crush the shredded material; a magnetic separator configured to separate ferreous materials from non-ferrous materials contained in the crushed materials; an electrostatic separator configured to receive the non-ferrous materials and separate the non-ferrous materials by a first electrical charge and a second electrical charge; and a screen configured to receive the separated materials from the electrostatic separator and apply vibration to classify the separated materials by a particle size.

In some aspects, the techniques described herein relate to a system, wherein the material contains at least one of nickel, manganese, cobalt, and lithium.

In some aspects, the techniques described herein relate to a system, further including an air separator and a dust removal system, wherein the air separator is configured to remove air from the material, and wherein the dust removal system is configured to collect particulate matter from the air separated by the air separator.

In some aspects, the techniques described herein relate to a system, further including a centrifuge, the centrifuge configured to receive the ferreous materials and separate the ferreous materials according to specific gravity.

In some aspects, the techniques described herein relate to a system, further including a centrifuge, the centrifuge configured to receive an output of the screen and separate the output according to specific gravity.

In some aspects, the techniques described herein relate to a system for separating minerals, the system including: a crusher configured to receive a material and crush the material; a magnetic separator configured to separate ferreous materials from non-ferrous materials contained in the crushed material; an electrostatic separator the non-ferrous materials and separate the non-ferrous materials by a first electrical charge and a second electrical charge; and a screen configured to receive the separated materials from the electrostatic separator and apply vibration to classify the separated materials according to at least first particle size and second particle size.

In some aspects, the techniques described herein relate to a system, further including a shredder positioned upstream of the crusher, the shredder configured to shred the material before the material is crushed by the crusher.

In some aspects, the techniques described herein relate to a system, further including a second crusher positioned between the magnetic separator and the electrostatic separator, the second crusher configured to crush the non-ferrous materials before the non-ferrous materials are separated by the electrostatic separator.

In some aspects, the techniques described herein relate to a system, wherein the material contains at least one of nickel, manganese, cobalt, and lithium.

In some aspects, the techniques described herein relate to a system, further including an air separator and a dust removal system, wherein the air separator is configured to remove air from the material, and wherein the dust removal system is configured to collect particulate matter from the air separated by the air separator.

In some aspects, the techniques described herein relate to a system, further including a centrifuge, the centrifuge configured to receive the ferreous materials and separate the ferreous materials according to specific gravity.

In some aspects, the techniques described herein relate to a system, further including a centrifuge, the centrifuge configured to receive an output of the screen and separate the output according to specific gravity.

In some aspects, the techniques described herein relate to a system for separating minerals, the system including: a magnetic separator configured to separate ferreous materials from non-ferrous materials contained in a clay; a crusher configured to receive the non-ferrous materials and crush the non-ferrous materials; an electrostatic separator configured to receive the materials from the second crusher and separate the materials by a first electrical charge and a second electrical charge; and a screen configured to receive the separated materials from the electrostatic separator and apply vibration to classify the separated materials by a particle size.

In some aspects, the techniques described herein relate to a system, further including a shredder positioned upstream of the crusher, the shredder configured to shred the material before the material is crushed by the crusher.

In some aspects, the techniques described herein relate to a system, further including a second crusher positioned upstream of the magnetic separator, the second crusher configured to crush clay before the clay is separated by the magnetic separator.

In some aspects, the techniques described herein relate to a system, wherein the clay contains at least one of nickel, manganese, cobalt, and lithium.

In some aspects, the techniques described herein relate to a system, further including an air separator and a dust removal system, wherein the air separator is configured to remove air from the material, and wherein the dust removal system is configured to collect particulate matter from the air separated by the air separator.

In some aspects, the techniques described herein relate to a system, further including a centrifuge, the centrifuge configured to receive the ferreous materials and separate the ferreous materials according to specific gravity.

In some aspects, the techniques described herein relate to a system, further including a centrifuge, the centrifuge configured to receive an output of the screen and separate the output according to specific gravity.

In some aspects, the techniques described herein relate to a system for separating minerals, the system including: a magnetic separator configured to separate ferreous materials from non-ferrous materials contained in a clay; a crusher configured to receive the non-ferrous materials and crush the non-ferrous materials; and an electrostatic separator configured to receive the materials from the second crusher and separate the materials by a first electrical charge and a second electrical charge.

In some aspects, the techniques described herein relate to a system, further including a screen configured to receive the separated materials from the electrostatic separator and apply vibration to classify the separated materials by a particle size.

In some aspects, the techniques described herein relate to a system, further including a shredder positioned upstream of the crusher, the shredder configured to shred the material before the material is crushed by the crusher.

In some aspects, the techniques described herein relate to a system, further including a second crusher positioned upstream of the magnetic separator, the second crusher configured to crush clay before the clay is separated by the magnetic separator.

In some aspects, the techniques described herein relate to a system, wherein the clay contains at least one of nickel, manganese, cobalt, and lithium.

In some aspects, the techniques described herein relate to a system, further including an air separator and a dust removal system, wherein the air separator is configured to remove air from the material, and wherein the dust removal system is configured to collect particulate matter from the air separated by the air separator.

In some aspects, the techniques described herein relate to a system, further including a centrifuge, the centrifuge configured to receive the ferreous materials and separate the ferreous materials according to specific gravity.

In some aspects, the techniques described herein relate to a system, further including a centrifuge, the centrifuge configured to receive an output of the electrostatic separator and separate the output according to specific gravity.

Figure 1A:
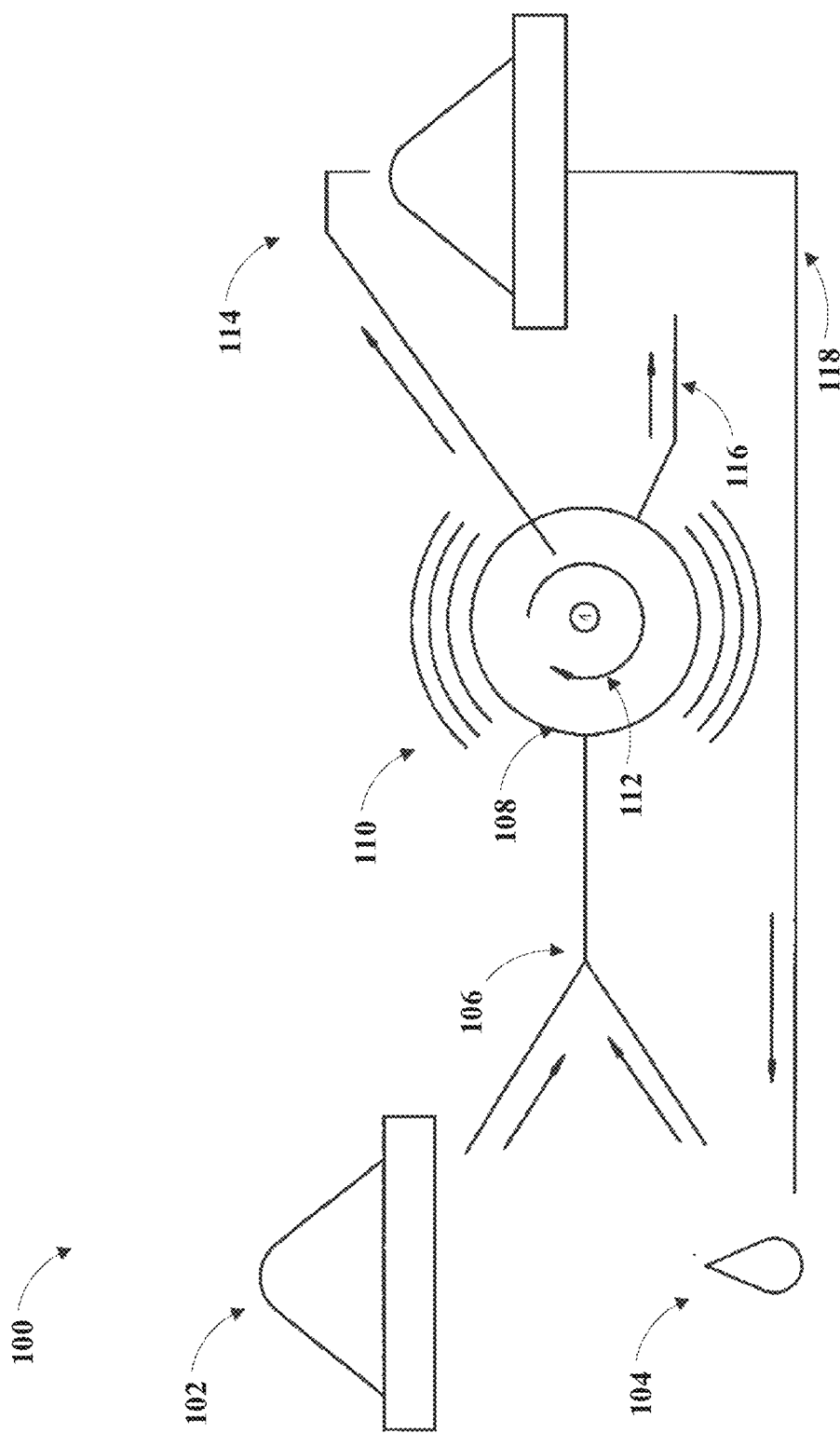
FIG. 1A schematically illustrates an example of a materials separation system.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Reference will now be made to the drawings, in which like reference numerals refer to like parts throughout. Unless indicated otherwise, the drawings are schematic not necessarily drawn to scale.

A system 100 for separating minerals by specific gravity with a centrifuge 108 is shown in FIG. 1A.

In FIG. 1A, a suitable feed source 102 is combined with a fluid 104 to form slurry 106. In some embodiments, the slurry can be fed into a centrifuge 108. In some embodiments, the slurry can be formed within the centrifuge from separate feeds of dry material (e.g., powder) and fluid (e.g., liquid). In some embodiments, the feed source 102 may be tailings from a mine, industrial waste or other materials that contain minerals of different specific gravity. In some embodiments, the feed source 102 may include materials from volcanic vents on the ocean floor, alluvial fans from rivers, materials from asteroids or other celestial bodies, or any other source of materials containing minerals of different specific gravity.

In at least some embodiments, centrifuge 108 may be operated in a reduced or zero gravity environment such as in orbit around a celestial body or on the surface of a natural or artificial object other than Earth. If desired, centrifuge 108 may be modified for operation in low gravity such as by sealing an otherwise open section (such as a top) of the centrifuge 108. As another example, the centrifuge 108 may be integrated into a mobile processing unit (MPU) capable of transporting the centrifuge 108 to a desirable location on a natural or artificial object other than Earth. The MPU may be capable of collecting and pre-processing material (e.g., the MPU may include crushers and/or rotary sieve devices to pre-process regolith or other source materials to a desired grain size). Additionally, the MPU and/or centrifuge 108 may include augers or paddles to assist in the movement of materials through the centrifuge 108 and related components (e.g., input hoppers, output hoppers, etc.), which may be particularly beneficial in low gravity environments where gravity cannot be relied upon for moving materials. In some embodiments, the MPU may include internal and/or external storage for storing valuable materials such as concentrate 116. As a particular example, the MPU may include mechanisms for robotically removing saturated collection cells (such as collection region 144 and collection regions 210a, 210b) from the centrifuge and storing the saturated collection cells for later collection.

In various embodiments, centrifuge 108 may be operated in environments of varying temperatures (e.g., environments on Earth, in space, or on the surface of objects other than Earth that are subject to extreme cold, extreme heat, or both). If desired, centrifuge 108 may be modified for operation in environments of different temperatures such as extreme cold or extreme heat. As one example, a cold-tolerant fluid such as ammonia may be utilized as fluid 104 when centrifuge 108 is operated in cold environments on Earth or in space. As another example, cold-tolerant materials (e.g., materials that are not excessively brittle and retain sufficient structure strength at low temperatures) may be used in forming the structure of centrifuge 108. As yet another example, centrifuge 108 may include heating elements that heat centrifuge 108, fluid 104, slurry 106, and/or other components of centrifuge 108. In environments such as the Moon, mined materials such as regolith may be excessively hot at the surface and excessively cold below the surface. In such environments, centrifuge 108 may be fed with a selective mix of surface regolith and subsurface regolith to achieve a desired temperature of the working materials (e.g., such that feed source 102 is within a suitable temperature range).

If desired, alternatives to fluid 104 may be used as a medium for material being separated. In particular, fluid 104 may be replaced with a solid medium formed of balls or grains, which may have a larger size than the feed source 102 being separated by centrifuge 108 and such solid carrier medium could be recovered with a rotary sieve or other recovery mechanism. Solid medium alternatives to fluid 104 may be beneficial in overcoming fluid issues in severe temperatures and/or low pressure or vacuum conditions (e.g., space). Embodiments described herein are particularly well-suited to low or zero-gravity and cold environments typical of extraterrestrial applications and can operate without human intervention.

The solid carrier medium can be used in the separator technology in lieu of water by using the same size balls of different weights. Solid medium carrier balls can be about ten microns in size and be coated in graphite. In some cases, the solid carrier medium can be at least 2 microns and or less than 20 microns, at least 5 microns and or less than 15 microns, and/or at least 10 microns and or less than 12 microns in size. Using a graphite powder as a lubricant, the balls can be magnetized or electrostatically charged to aid in retrieving them, controlling them, and/or sorting them, since a negative charge to a positive charge can repel each ball and act as a self-agitator. By alternating the current between a positive and a negative electrical flow, the solid medium carrier can be more readily controlled and produce a higher state of separation than even a water solution. In some cases, the solid medium carrier can be the same size as the mineral being processed (e.g., gold). In some cases, an alternative to fluid 104 can include using a pressurized drum and a feed system charged. Helium can be electrically energized to create a cold plasma. The cold plasma and the solid medium carrier can carry particles of a mined material in a fluidic state. In some cases, the solid carrier medium can be magnetized, and the plasma can be electrically energized. The amount and consistency of the plasma can be adjusted during operation of the separators.

The solid carrier medium can include polymer balls and/or spheres coated with graphene. In some cases, the solid carrier medium balls and/or spheres may have no friction or substantially no friction when each of the balls and/or spheres are in contact with each other and/or other materials (e.g., minerals, slurry, etc.). When not in use, the solid carrier medium can be stored in a carrier tank. The status of the solid carrier medium can be monitored for wear and tear. For instance, the solid carrier medium balls and/or spheres can be replaced with new spheres and/or balls when the graphene coating is worn through. The condition of the graphene coating can be assessed by subjecting the solid carrier medium balls and/or spheres to an electrical conductivity test. In some cases, the solid carrier medium balls and/or spheres can be replaced according to a predefined schedule (e.g., every 1 week, 2 weeks, 1 month, 2 months, etc.). The schedule can be based on the type of materials to be processed and/or the separation process.

The solid carrier medium can beneficially maintain its properties in hot and/or cold environments. Because the graphene coating is conductive, the solid carrier medium balls and/or spheres can be electrically charged and/or magnetized. Once magnetized, the balls and/or spheres can be controlled by reversing the polarity of the balls and/or spheres. This can beneficially allow for easy collection and rotational movement of the balls and/or spheres within the separator. The use of solid carrier medium balls and/or spheres in lieu of and/or in combination with water can beneficially allow mining in locations where water is scarce and/or not available. The use of a solid carrier medium in lieu of water can also prevent the contamination of water. For instance, the use of solid carrier medium balls and/or spheres can prevent radioactive contamination of water when separating minerals contained in radioactive mixtures, compositions, etc.

In some embodiments, the feed source 102 may include tailings or other similar materials that have been ground to a suitable particle size or to a suitable range of particle sizes. As an example, the feed source 102 may include materials that have been ground, or otherwise processed, such that the nominal maximum particle size in feed source 102 is a range of about 50 microns to 200 microns, for example, about 100±15 microns. In some embodiments, feed source 102 may be combined with a fluid 104 such as water or ammonia to form slurry 106 (e.g., fluidized slurry 106). Fluid 104 may include any suitable fluid and, if desired, may include chemicals that aid in stratification by specific weight within the centrifuge 108. As an example, the fluid 104 may include lubricants, surfactants, and other chemicals that facilitate or accelerate stratification by specific weight within the centrifuge 108. As another example, the fluid 104 may include anti-freeze additives that lower that freezing point of the fluid, which aid in preventing freezing of fluid 104 when centrifuge 108 is operating in cold environments, such as extraterrestrial environments. As noted above, in various embodiments, slurry 106 may be created inside centrifuge 108 by separately adding fluid 104 and feed source 102 into centrifuge 108.

Slurry 106 may be processed by the centrifuge 108 to produce concentrate 116 and tailings 114. As depicted in FIG. 1A, centrifuge 108 may spin (as indicated by arrow 112) to produce centripetal forces (e.g., centripetal acceleration) that are significantly higher than acceleration due to gravity. These centripetal forces may facilitate the separation of components of slurry 106 by the different specific weights of those components. In other words, minerals in slurry 106 having a greater specific weight may tend to "fall", while minerals in slurry 106 having a lower specific weight may tend to "rise," in an acceleration field (such as gravity or such as the radially directed field found in a centrifuge). By using a centrifuge that provides substantial centripetal forces, the separation of materials by specific weight can be accelerated.

In some embodiments, slurry 106 may be processed by multiple centrifuges 108 coupled together in series, where each centrifuge processes the reject material, or tailings 116, from a prior centrifuge. In such embodiments, multiple stages of centrifuges coupled together in series may be configured to separate a variety of materials out of slurry 106. As an example, an initial stage formed of one or more centrifuges may separate out a first material of a first specific weight, a second stage formed of one or more additional centrifuges may receive the tailings from the initial stage and may separate out a second material of a second specific weight less than the first specific weight, a third stage formed of one or more additional centrifuges may receive the tailings from the second stage and may separate out a third material of a third specific weight less than the second specific weight, and so on for as many stages as desired. Such embodiments may allow processing of a spectrum of many materials from high to low specific weight from a particular feed source.

In some embodiments, multiple centrifuges 108 may be coupled together in parallel to increase processing speed and/or volume. In other embodiments, configurations of both serial and parallel couplings are provided. As an example, system 100 may include a first stage formed from one or more centrifuges 108 coupled together in parallel and the first stage may be coupled in series with at least a second stage formed from one or more centrifuges coupled together in parallel. In such an example, the first stage may separate out a first mineral of a relatively heavy specific weight, while the second stage may separate out a second mineral of a lower specific weight than the first mineral. In general, stages need not be formed from identical numbers of centrifuges coupled together in series. As an example, a first stage may be formed from a single centrifuge, while a second stage may be formed from two or more centrifuges coupled together in parallel. In general, references to a centrifuge in the present disclosure are not limited to a single centrifuge and instead encompass a single centrifuge and combinations of multiple centrifuges coupled together in series, parallel, or a combination of series and parallel connections.

As depicted by sound waves 110, centrifuge 108 may be assisted by coupling vibrations or oscillating energy to the fluid in the centrifuge 108. In embodiments, the energy may be in the acoustic range, and the centrifuge may be referred to as an acoustically-assisted centrifuge 108, though it will be understood that in some embodiments the desired energy may oscillate outside the acoustic range. As an example, centrifuge 108 may include one or more acoustic modules that provide acoustic energy 110 into the slurry 106 within the centrifuge 108. The energy 110 may, as an example, represent sub-sonic sound waves. As examples, energy 110 may range from 0.5 Hz to 9 Hz and may vary between 0.5 Hz to 9 Hz over time. As another example, energy 110 may vary between 0.5 Hz and 40 Hz over time. In some cases, sound induction including polyphonic, subsonic, and ultrasonic sound frequencies can be used simultaneously with four inducers working in a circular pattern. The centrifuge can include more than or less than four inducers. The inducers can be coupled to the centrifuge. In some cases, the frequency of the inducers can match that of the with spin of the drum. The hertz range of each inducer can also vary. In some cases, air injection and sound induction can create a super cavitation field. Beneficially, super cavitation can reduce or eliminate friction between particles in a slurry.

Acoustic energy 110 may, in various embodiments, include oscillations at multiple frequencies provided simultaneously, sometimes referred to as polyphonic energy. For example, energy 110 may include energy of multiple acoustic frequencies. In some embodiments, different frequencies of energy 110 may create different desired effects. As an example, a first frequency (or set of frequencies) may be tuned to increase mobility of a first mineral, while a second frequency (or set of frequencies) may be tuned to increase mobility of a second mineral or a fluid component of the slurry in the centrifuge 108. As another example, a first frequency (or set of frequencies) may be provided to reduce friction or sticking between particles, while a second frequency (or set of frequencies) may be provided to push minerals of a lower specific weight than desired out of the collection regions.

If desired, acoustic energy 110 may include energy that cancels, minimizes, or reduces undesired ambient energy or energy created by a component of the system. As an example, there may be ambient acoustic energy or acoustic energy created by operation of the centrifuge 108 that slows the rate of stratification in the centrifuge, depending upon the materials of interest and the dimensions of the centrifuge. In such examples, acoustic energy 110 may include energy that cancels such undesirable acoustic energy.

In some embodiments, the frequency or frequencies of energy 110 may be configured to increase fluidization of components of slurry 106. In particular, acoustic energy 110 may help to reduce friction between components of slurry 106, thereby accelerating the separation of materials by specific weight under an acceleration force (such as the centripetal forces generated by centrifuge 108). In various embodiments, energy 110 may increase lubrication in the slurry 106 within the collection regions, may induce supercavitation within the collection regions, may create one or more standing waves within the collection regions.

If desired, centrifuge 108 may be assisted by something other than oscillating energy of the type depicted by sound waves 110. As an example, in some embodiments, system 100 may include an energy injection module that injects air or fluid into the centrifuge 108 and, in particular, that injects air or fluid into collection regions (such as regions 144 of FIG. 1B). Injecting air or fluid into the collection regions may help to disturb the sediment, reduce friction between components of slurry 106 and/or otherwise aid in stratification of materials by specific weight within the collection regions. In some embodiments, the injected air or fluid has a lower specific weight than the mineral being concentrated and may have the effect of washing minerals of lower specific weight out of the collection regions.

Figure 1B:
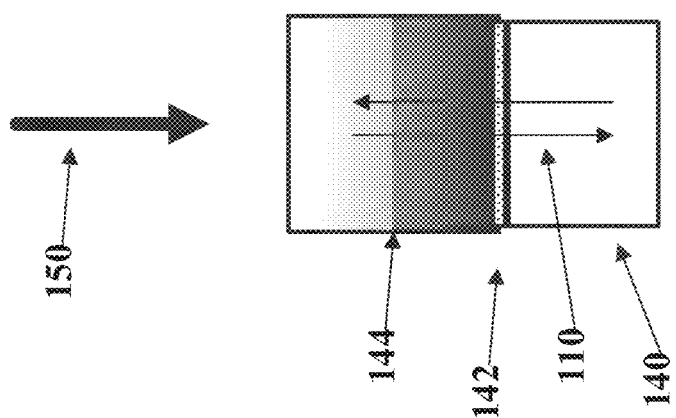
FIG. 1B schematically illustrates an example energy injection module and collection region for stratifying materials by specific weight.

FIG. 1B illustrates an example of an energy injection module 140 of the type that may generate energy 110 of FIG. 1A. The energy injection module 140 may be separated from a collection region 144 by a membrane 142. As shown in FIG. 1B, slurry within the collection region 144 may stratify by specific weight due to the centripetal forces 150 of the spinning centrifuge 108 and with the assistance of energy 110 from energy injection module 140. In particular, components of slurry 106 having the highest specific weight may tend to migrate towards the outside of centrifuge 108 (e.g., the direction of centripetal force 150 illustrated in FIG. 1B), while components having lower specific weights may migrate inwards. Energy injection module 140 may vibrate (e.g., in directions parallel to the centripetal forces 150 and at suitable frequencies, which may be in the subsonic range) and the vibrations of energy injection module 140 may be conveyed as energy 110 via membrane 142 into collection region 144. As an example, the energy injection module 140 may produce energy that propagates parallel to the direction of the centripetal force 150 illustrated in FIG. 1B). The energy 110 may reduce friction amongst the particles of the slurry 106, thereby increasing the speed of stratification according to specific weight within the collection region 144.

Membrane 142 may be formed from materials that facilitate coupling energy from module 140 into collection region 144. As examples, membrane 142 may be formed from Kevlar, graphene, steel, titanium, titanium nitride, rubber, synthetic rubber, metal, plastic, other suitable materials, or combinations of these and other suitable materials. In some embodiments, membrane 142 may be a flexible membrane.

Referring again to FIG. 1A, concentrate 116 may be produced by one or more centrifuges 108, which may be coupled together in series, in parallel, or in a configurations including parallel and serial combinations. In various embodiments, concentrate 116 may represent components of slurry 106 having the highest specific gravity. Similarly, tailings 114 may be produced by centrifuge 108 and may represent the components of slurry 106 having a lower specific gravity. While tailings is sometimes referred to as a waste product, in some embodiments the tailings 114 may be a desired product (e.g., such as examples in which concentrate 116 represents an undesired contaminant).

As shown by path 118, excess fluid may be extracted from tailings 114 and reused as in-feed fluid 104, thus cyclically treating the material to progressively extract further minerals.

Figure 2:
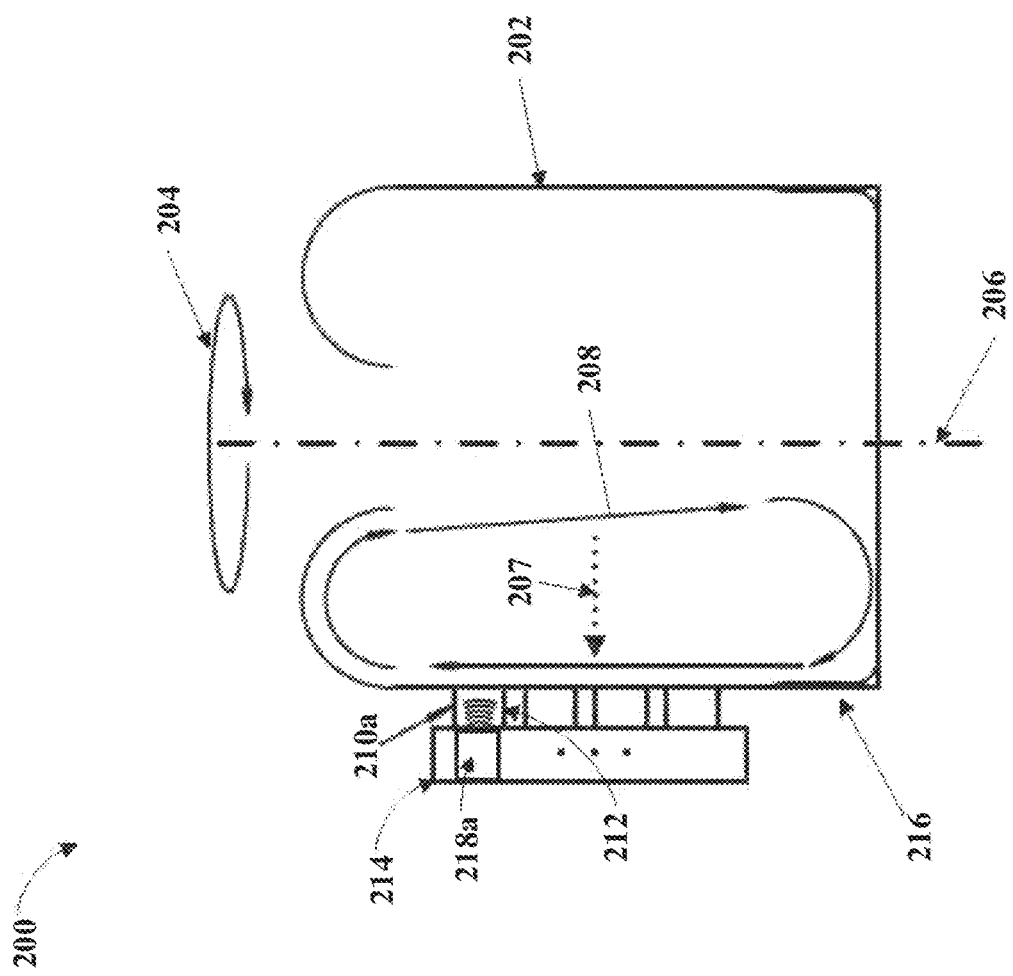
FIG. 2 shows a schematic cross-sectional side view of a centrifuge for separating materials by specific weight.

A cross-section side view of a centrifuge 200 is shown in FIG. 2. The centrifuge 200 of FIG. 2 may be an example of the centrifuge 108 discussed in connection with FIGS. 1A and 1B. As shown in FIG. 2, the centrifuge 200 may have sidewalls 202 that rotate in direction 204 about axis 206, producing centripetal forces 207. The centripetal forces 207, which may be significantly larger than gravitational acceleration, may increase the speed of stratification by specific weight of constituents of the slurry processed by the centrifuge 200. The centrifuge 200 may rotate about axis 206 at a speed (e.g., revolutions per minute or RPM) sufficient to produce, in combination with the radius of the centrifuge 200, the desired magnitude of centripetal forces 207. As an example, the centrifuge 200 may rotate at approximately 500 RPM. Centrifuge 200 may be formed of suitable materials. If desired, the walls and interior components of centrifuge 200 may be coated with high-wear coatings such as titanium nitride, ceramics, metals, etc., which may help to prevent rapid abrasion from slurry 208. If desired, centrifuge 200 may include control circuitry that prevents operation of the centrifuge 200 unless one or more wear-items are replaced, repair, or otherwise refurbished after some number of operating hours, which may be predetermined or which may be determined based on observed operating conditions.

As shown in FIG. 2, slurry 208 may circulate within the centrifuge 200. In particular, the slurry 208 may be pressed against the sidewalls 202 by centripetal forces 207. The top of the sidewalls 202 may be curved inwards, such that the slurry 208 that migrates up the sidewalls is thrown back down to the bottom of the centrifuge. As a result, the slurry may circulate in the manner illustrated in FIG. 2. If desired, the centrifuge 200 may include a stator (e.g., a fixed element that does not rotate with the centrifuge or rotates as a slower speed) at the top of the sidewalls 202. Such a stator may direct momentum of slurry that reaches the top of the sidewalls 202 such that the slurry is directed back to the bottom of the centrifuge, thus improving circulation of the slurry 208 within the centrifuge. Such a stator may, in some embodiments, be curved to assist in directing slurry 208 downwards and inwards from the top of centrifuge at the sidewalls 202 towards the central bottom of centrifuge 200. Downward direction of the slurry by the stator can be useful both terrestrial and extraterrestrial (low or zero gravity) environments. In some embodiments, centrifuge 200 may be sealed. Additionally, centrifuge 200 may include mechanisms, such as valves and moveable gates, that actuate to facilitate the addition of slurry 208 and the removal of slurry and/or concentrate. A centrifuge 200 operated in a sealed configuration may be beneficial for operations in a reduced gravity environment.

The circulating slurry 208 may pass over collection regions including collection region 210a. As the slurry 208 passes over the collection regions such as region 210a, the particles having greater specific weights may become trapped within the collection regions. In at least some embodiments, the collection regions 210a may be removably coupled to the sidewalls 202 of the centrifuge 200.

FIG. 2 also illustrates a housing 214, which may include energy injection generators such as illustrated generator 218a that inject energy 212, which may be pressure waves, acoustic energy, or other forms of energy, into the collection regions such as region 210a. The housing 214 may, in at least some embodiments, be removably coupled to the centrifuge. As discussed in connection with FIGS. 1A and 1B, the energy injection generators such as generator 218a may enhance and accelerate stratification of minerals in the slurry 208 by specific weight within the collection regions. Additionally, the energy injection generators may help prevent the collection regions from clogging by encouraging mixing of the slurry inside the collection regions with the slurry passing by the collection regions. In particular, the energy injection generators may encourage the exchange of stratified minerals having lower specific weights and located at the "top" (e.g., radially inward in the orientation of the centripetal forces 207) of the collection regions with mixed slurry flowing by the collection regions. In this manner, minerals in the slurry 208 having the greatest specific weights can tend to collect or concentrate at the "bottom" of the collection regions (e.g., radially outward in the orientation of the centripetal forces 207).

In some embodiments, the centrifuge 200 may include a waste drain 216. In such embodiments, the waste drain 216 may be opened as the slurry 208 may be discharged from the centrifuge 200 when desired. As an example, after minerals having the highest specific weights are concentrated in the collection regions, the remaining slurry 208 may be practically devoid of such minerals and the waste drain 216 may be opened. If desired, the waste drain 216 may be opened while the centrifuge 200 is still spinning (e.g., with or without slowing the centrifuge 208 down from its typical operating speed). After draining waste slurry via the waste drain 216, fresh slurry 208 may be added to the centrifuge 200 for further processing.

Figure 3:
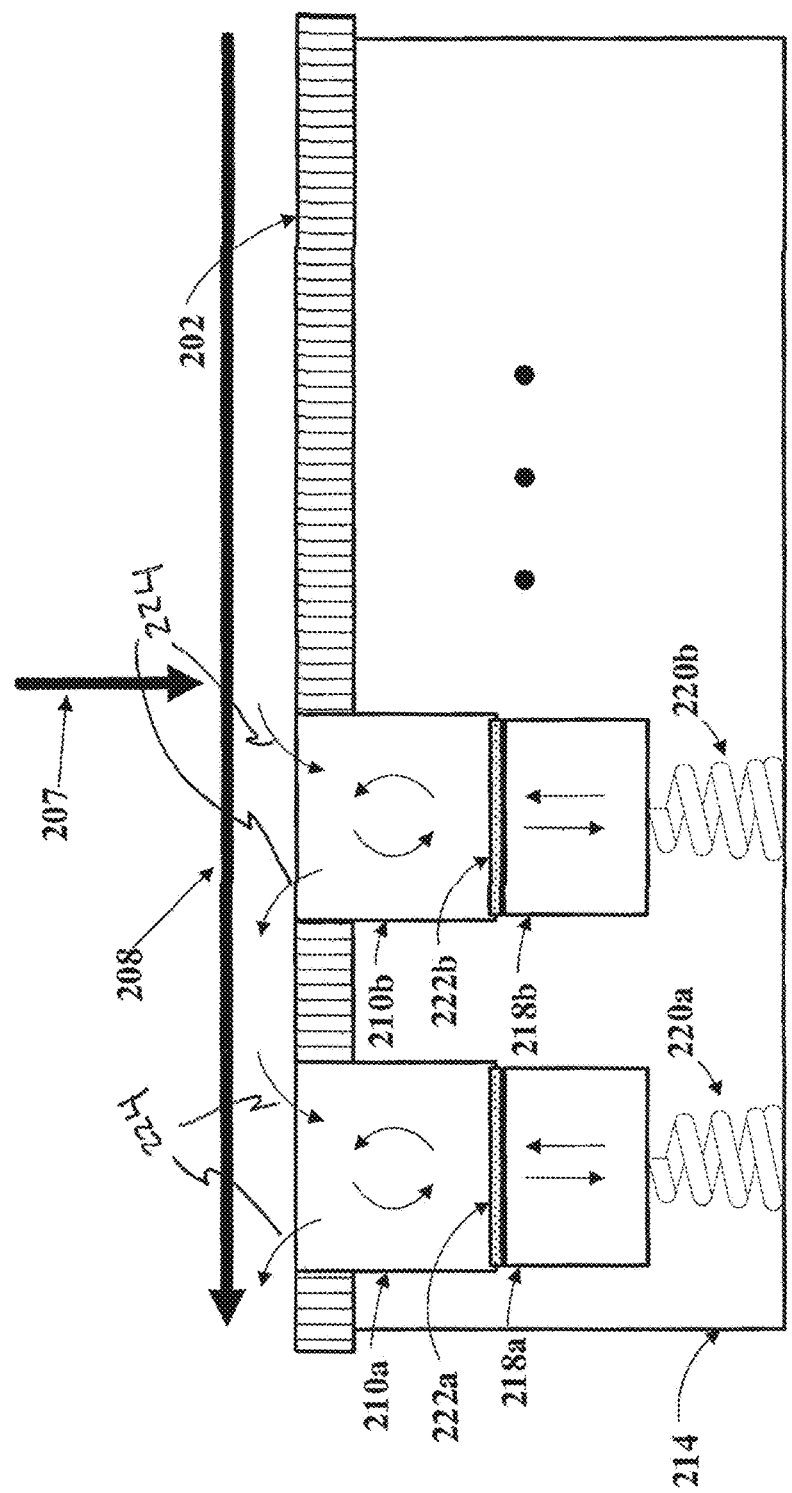
FIG. 3 is a close-up schematic diagram of radially-mounted energy injection modules and collection regions in the centrifuge of FIG. 2.

A close-up diagram of the energy injection modules 218 and collection regions 210 of FIG. 2 is shown in FIG. 3. As shown in FIG. 3, the slurry 208 may pass over collection regions 210a, 210b, etc. and centripetal forces 207 (from the spinning of centrifuge 200) may press the slurry 208 into the collection regions.

As shown in FIG. 3, the housing 214 may contain one or more collection regions 210a, 210b, etc., each of which can be associated with an energy injection module 218a, 218b, etc. Moreover, the housing 214 may be removably coupled to the centrifuge sidewalls 202. As discussed in connection with FIGS. 1A, 1B, and 2, energy injection modules such as modules 218a, 218b may be separated from collection regions by membranes such as membranes 222a, 222b. The membranes separating energy injection modules from collection regions, such as membranes 222a, 222b may be formed from materials that facilitate coupling energy from module 140 into collection region 144. As examples, the membranes may be formed from Kevlar, graphene, steel, titanium, titanium nitride, rubber, synthetic rubber, metal, plastic, other suitable materials, or combinations of these and other suitable materials. In some embodiments, the membranes may be flexible membranes.

In at least some embodiments, the energy injection modules 218a, 218b, etc. may be held against the collection regions 210a, 210b, etc. by springs 220a, 220b, etc. The springs 220a, 220b may provide a counter force to centripetal forces 207, such that the energy injection modules 218a, 218b remain in communication with the collection regions 210a, 201b such that they can couple energy into the collection regions without having to overcome the centripetal forces 207. In at least some embodiments, the springs 220a, 220b may provide a variable spring force, which can be varied in relation to the rotation speed of centrifuge 200 and in relation to the mass of minerals in collection regions 210a, 210b. As an example, the spring force provided by springs 220a, 220b may be increased with increasing rotation speed of the centrifuge 200 and may be increased as minerals having higher specific weights collect in the collection regions. In some embodiments, springs 220a, 220b may be formed from air chambers and the spring force may be increased or decreased by pumping air into or out of the air chambers.

If desired, centrifuge 200 may include sensors that measure the mass of material within collection regions 210a, 210b. As one example, springs 220a, 220b may include sensors that detect how much force is imparted on the springs by the mass within the collection regions (which is subject to centripetal forces 207). The mass of material within collection regions 210a, 210b may be used to determine if the centrifuge is properly balanced, if the stiffness of a spring needs to be increased (e.g., by pumping more air into a suitable air chamber), or if a particular collection region is full or clogged. In at least some embodiments, centrifuge 200 may include control circuitry configured to use information from such sensors to balance the centrifuge (e.g., by selectively disabling one or more energy injection modules to reduce the rate of mass build-up in those modules), to determine when processing of the slurry is complete (e.g., when the desired materials having the greatest specific weights have been suitably concentrated in the collection regions), or for other purposes.

As shown in FIG. 3, the slurry 208 may stratify within the collection regions 210a. 210b according to specific weight, with the minerals with the heaviest specific weights accumulating at the "bottom" (e.g., the outside of centrifuge 200) of the collection regions. Additionally, minerals with lighter specific weights may escape the collection regions and allow fresh slurry to enter the collection regions. As a result, the minerals with the heaviest specific weights may accumulate in the portions of the collection regions more remote from the centrifuge axis over time.

Figure 4:
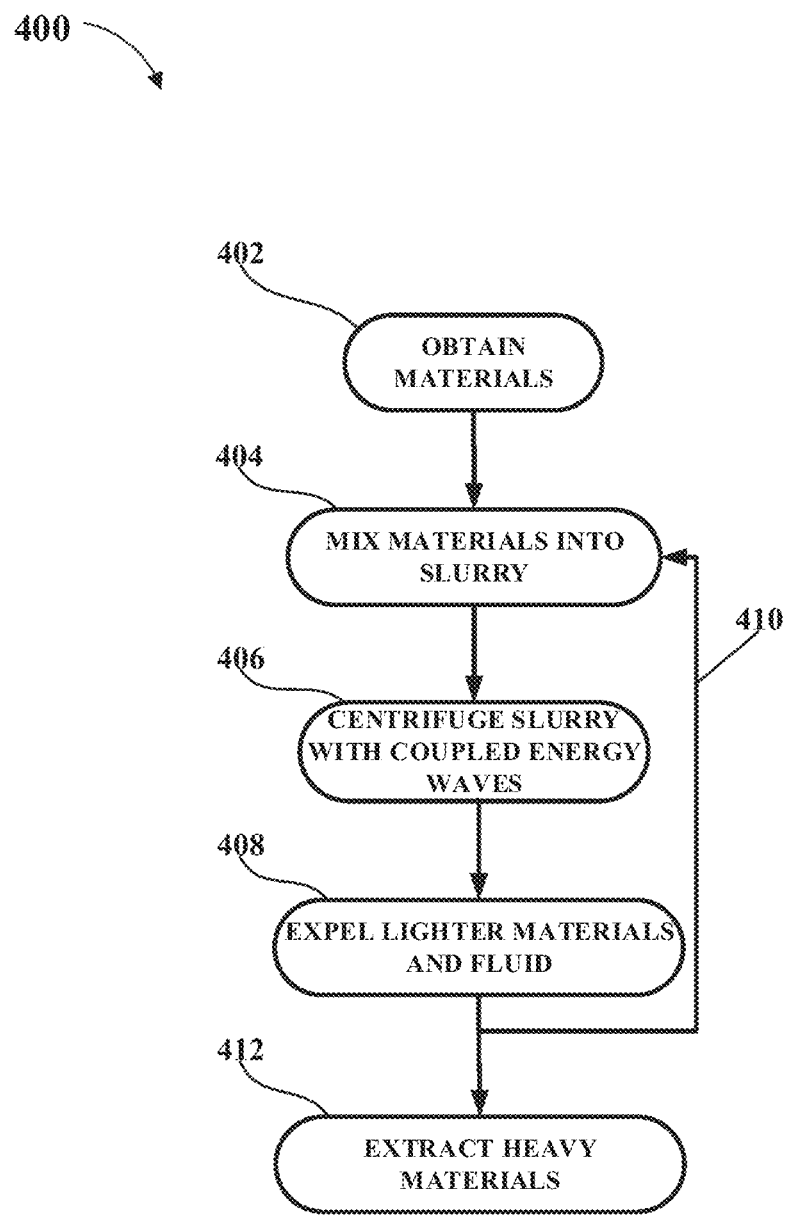
FIG. 4 is a process flow diagram of an example of a method for using a materials separation system.

FIG. 4 is a process flow diagram of an example method 400 for separating minerals by specific gravity using an centrifuge with energy coupled to it to enhance stratification. The method 400 may be performed, for example, by the centrifuge described herein.

At block 402, materials may be obtained for processing in the centrifuge. As discussed herein, the materials may be mine tailings or other material streams that include a mixture of minerals having different specific weights. Additionally, the materials may be ground, screened, or otherwise processed in preparation for separation in the centrifuge. As an example, the materials may be processed to have a suitable particle size.

At block 404, the materials may be mixed with suitable fluid into a slurry. In some embodiments, the slurry may be added to the centrifuge. In at least some embodiments, the centrifuge may be spinning during the addition of slurry. In other embodiments, the centrifuge may be spun up after introduction of slurry. In other embodiments, the slurry may be formed within the centrifuge by separate addition of dry material, such as powder, and fluid.

At block 406, the centrifuge may be spun and modules may be activated to introduce energy into collection regions of the centrifuge. As discussed with respect to FIGS. 1A-3, both the centripetal forces generated by the rotation of the centrifuge and the lubricating energy coupled to the collection regions (e.g., acoustic energy produced by energy injection modules, which may be acoustic modules) may enhance and expedite the concentration and stratification of minerals having high specific densities in the collection regions of the centrifuge. As examples, the energy injected by the energy injection module may increase lubrication between particles in the slurry, may reduce friction within the slurry, may create standing waves within the collection regions that reduce friction between particles in the slurry, and/or may induce super-cavitation that reduces friction between particles in the slurry.

At block 408, waste slurry may be removed or expelled from the centrifuge. In some embodiments, block 408 may be performed after sensors in the centrifuge determine that the collection regions are full, nearly full, filled to a desired capacity, or that the mass of the collection regions has stabilized (e.g., indicating that any higher specific weight minerals in the slurry are already contained within the collection regions and the circulating slurry should be discarded). As noted by arrow 410, additional slurry may be added to the centrifuge after expelling waste slurry in block 408. In other words, blocks 404, 406, and 408 may be repeated as desired. In some embodiments, blocks 404, 406, and 408 may be repeated until sensors in the centrifuge indicate that the collection regions are full or nearly full of material having high specific weight.

At block 412, heavy materials, or materials having a high specific weight, may be extracted from the centrifuge. In some embodiments, block 412 may involve stopping the centrifuge and physically removing and emptying the collection regions, which now contain concentrated high-specific-weight minerals.

A system for separating minerals using a gas injection module is shown in FIGS. 5A-5D.

Figure 5A:
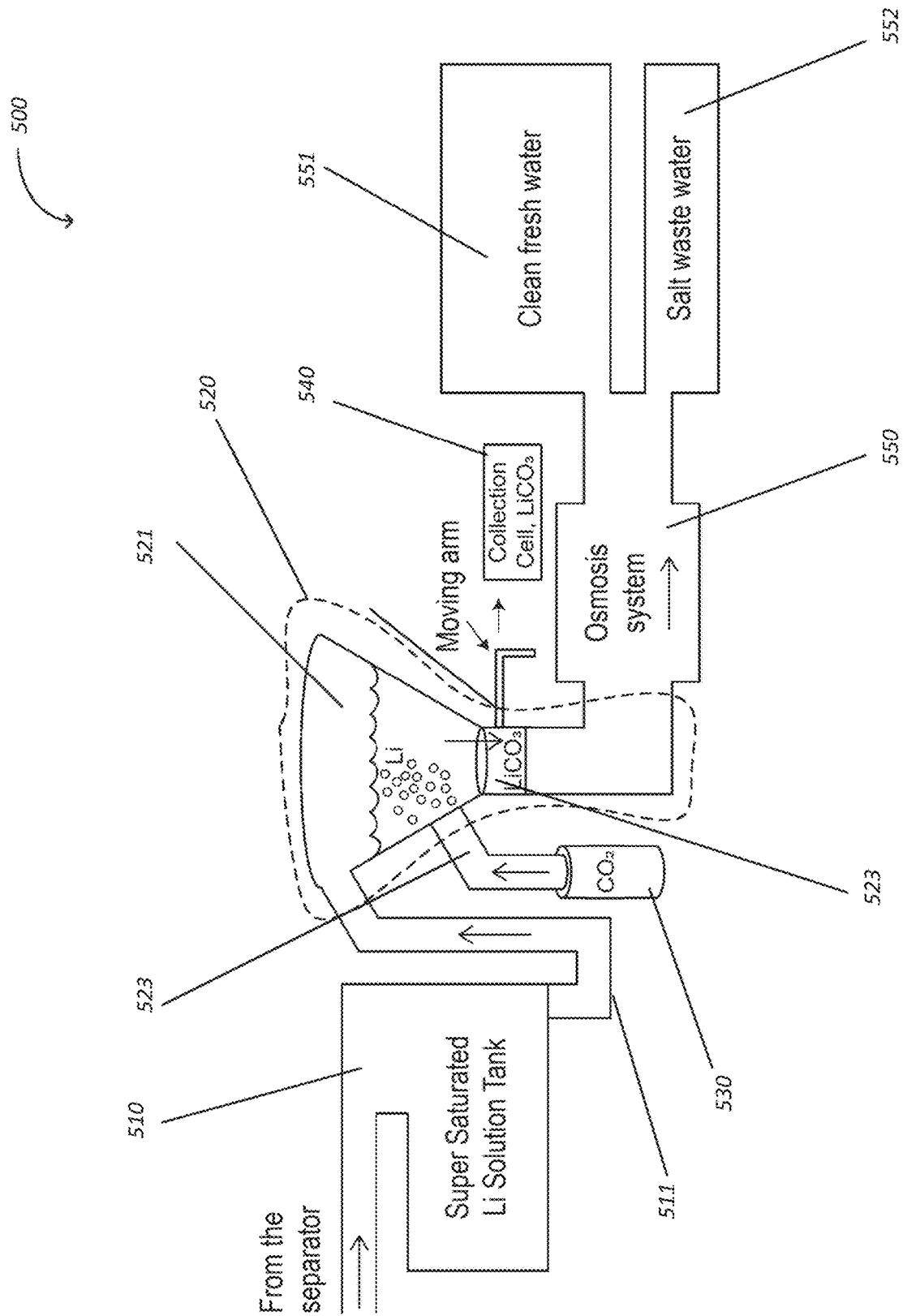
FIGS. 5A-5D schematically illustrate an example system for separating a mineral from a clay using a gas injection module.
Figure 5B:
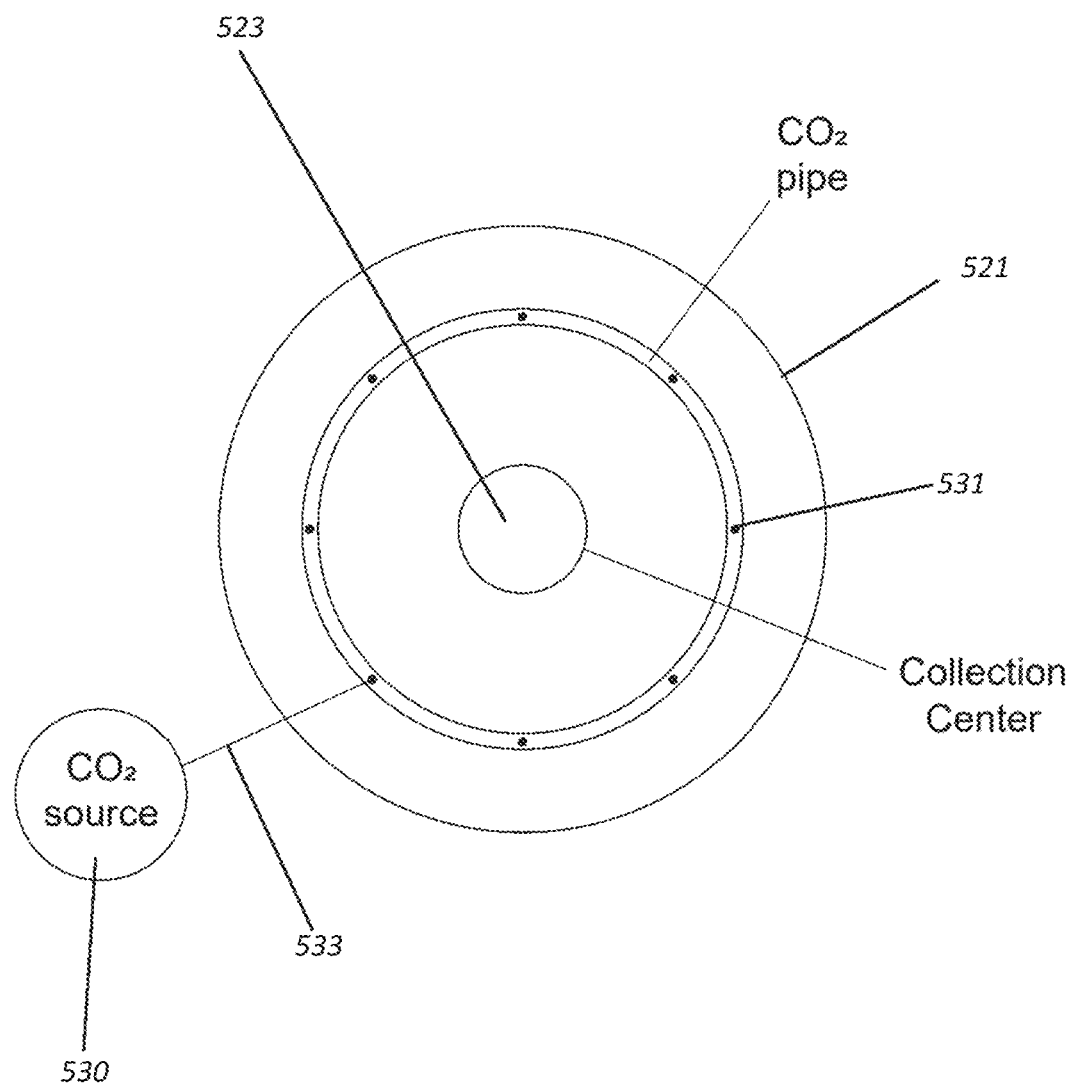
Figure 5C:
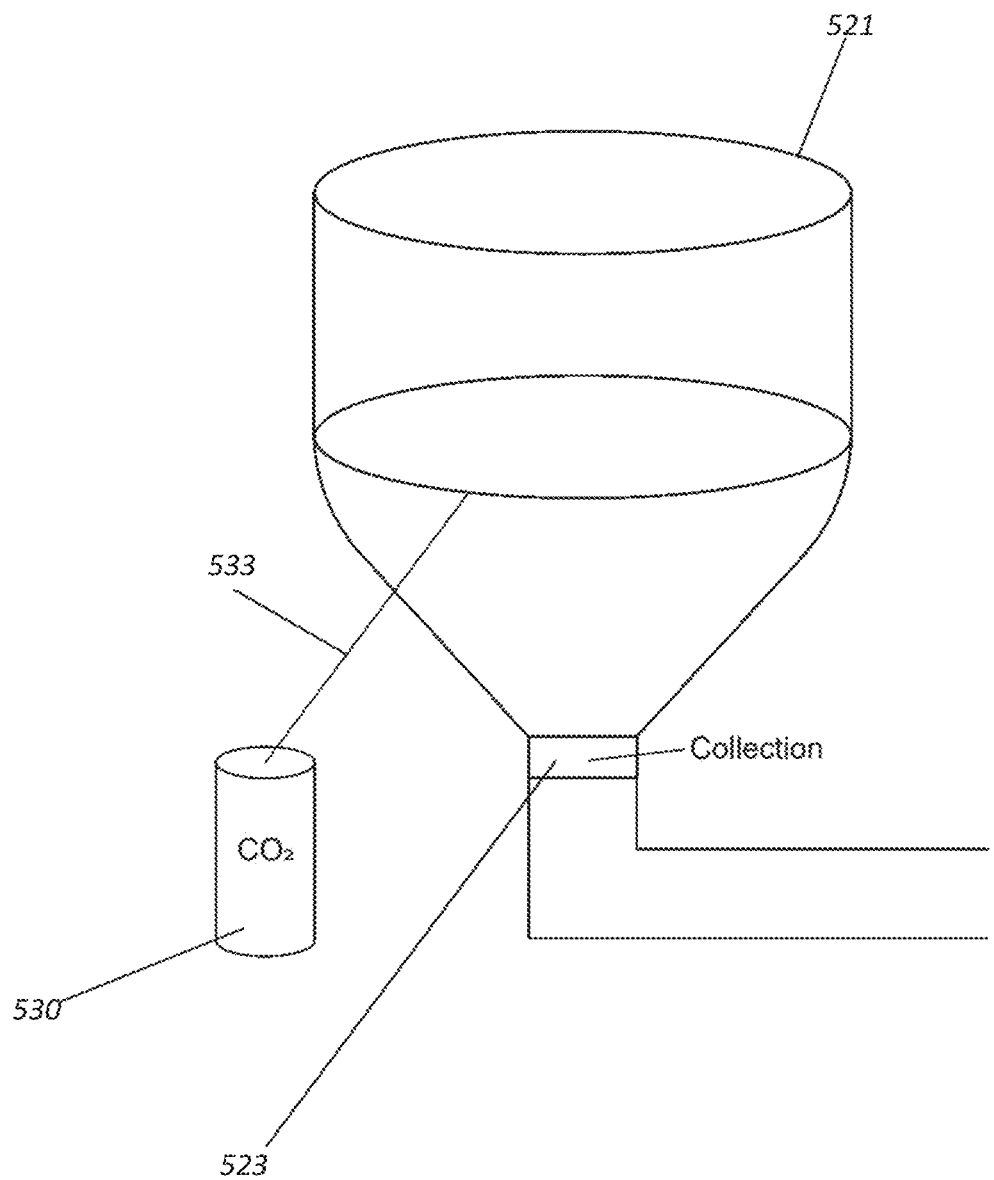
Figure 5D:
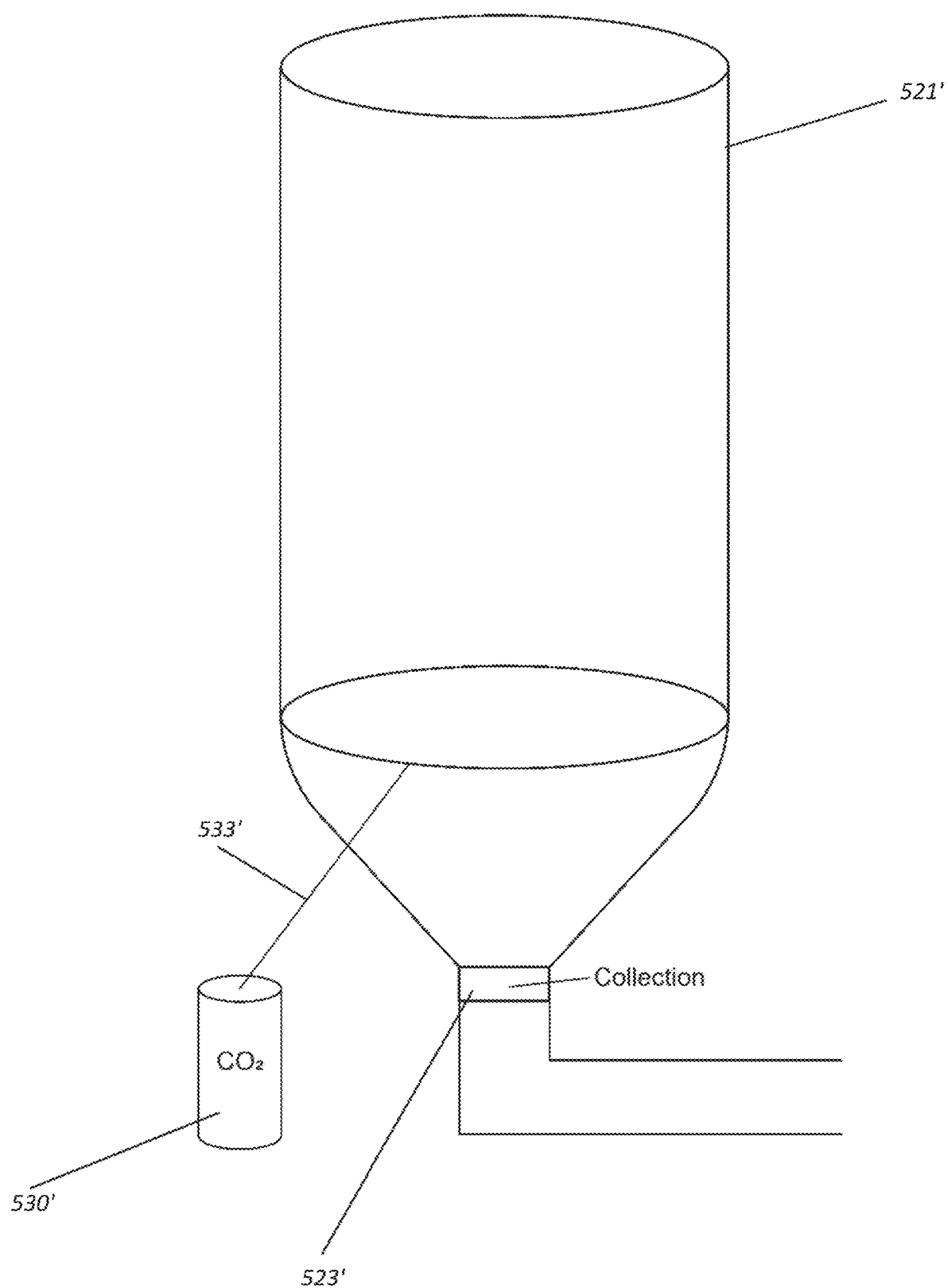
Figure 6A:
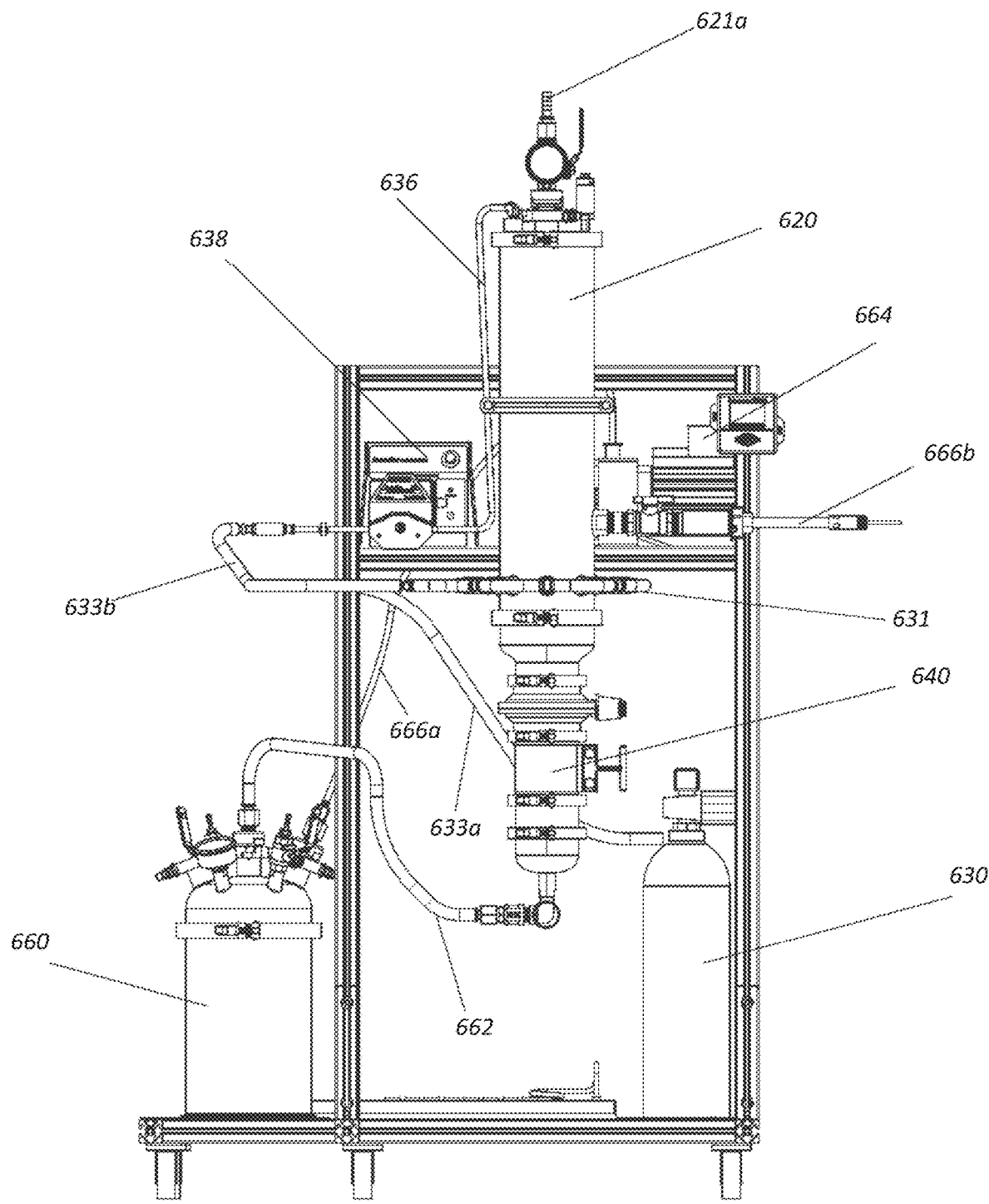
FIGS. 6A-6F schematically illustrate another example system for separating a mineral from a clay using a gas injection module.
Figure 6B:
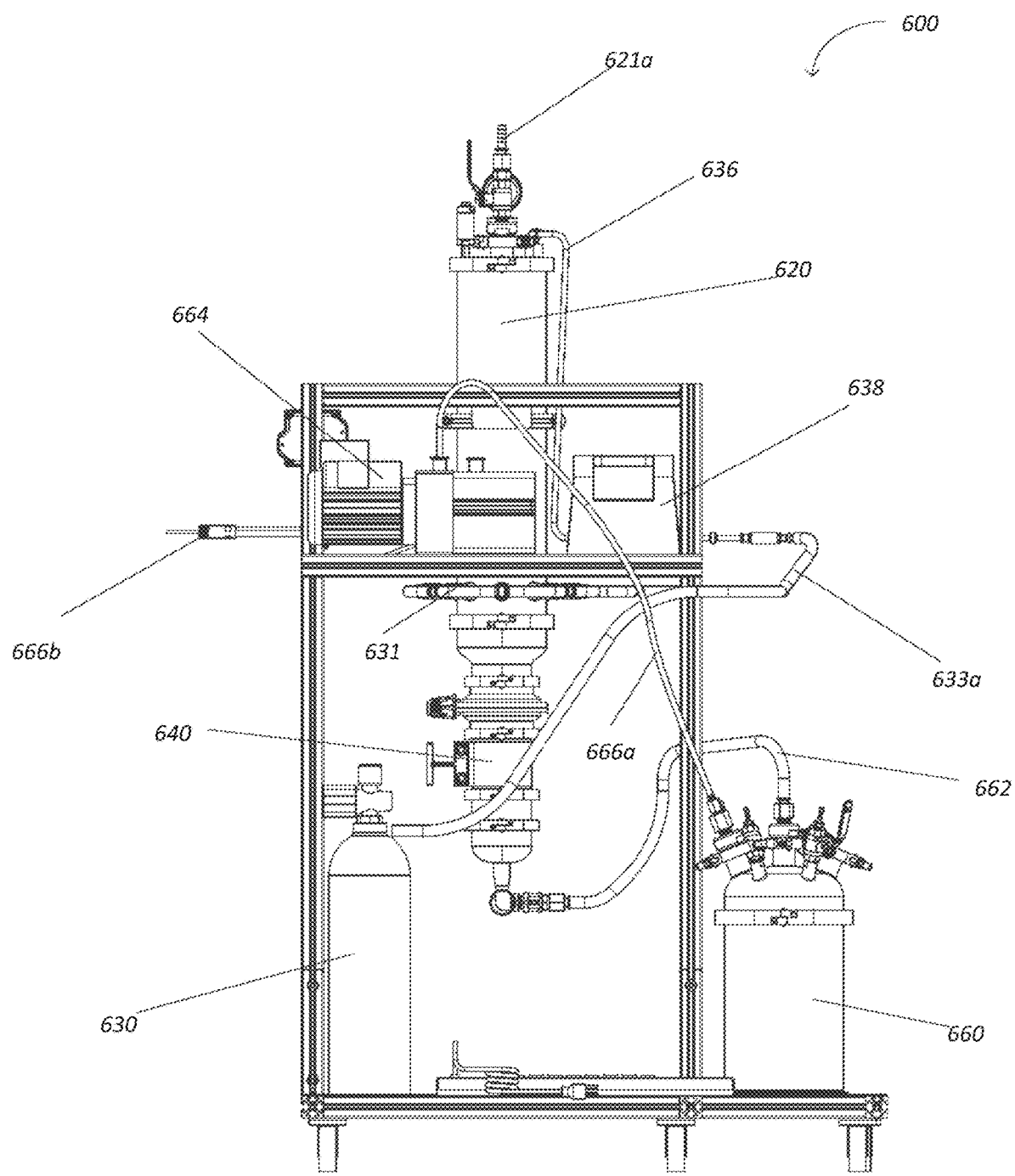
Figure 6C:
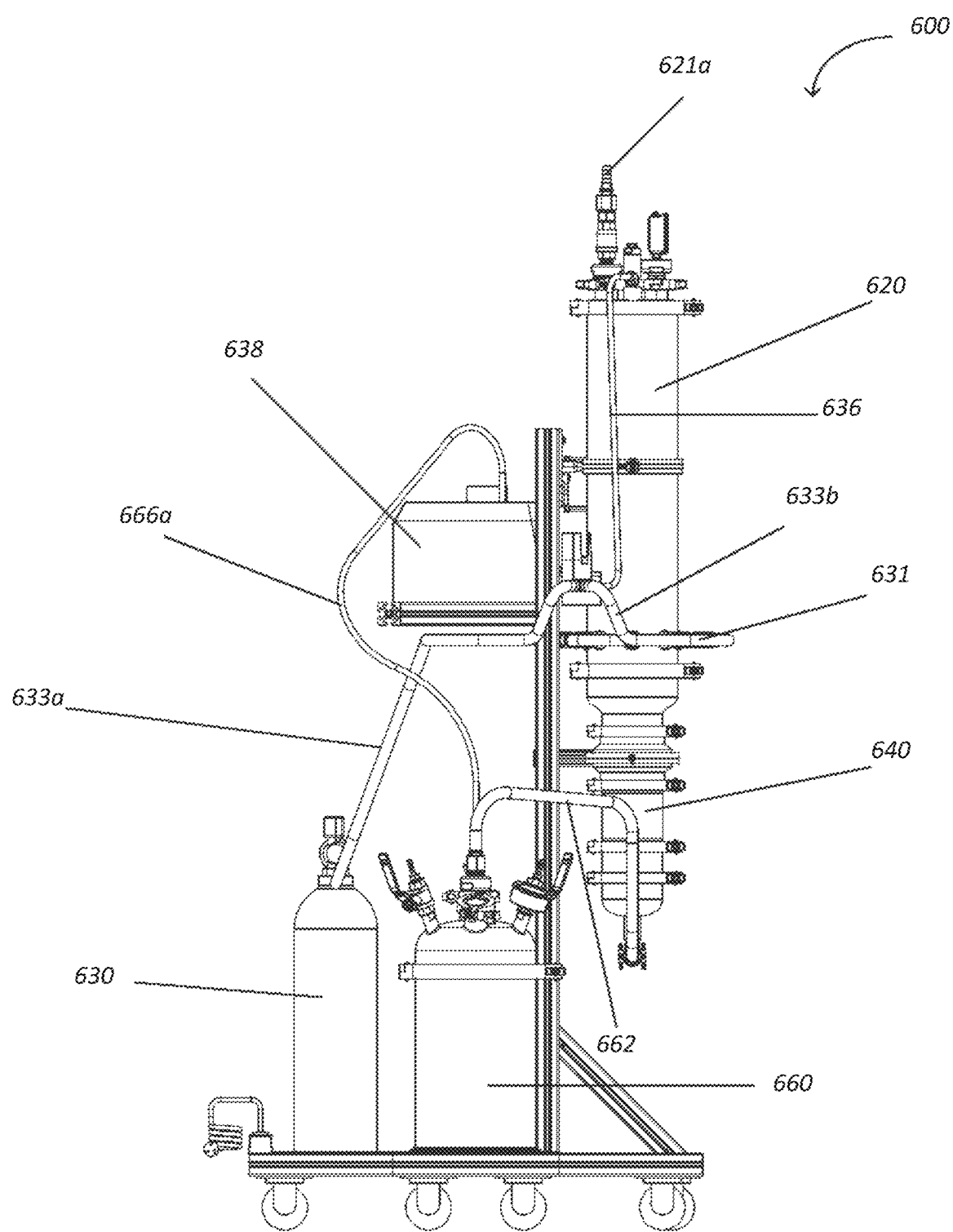
Figure 6D:
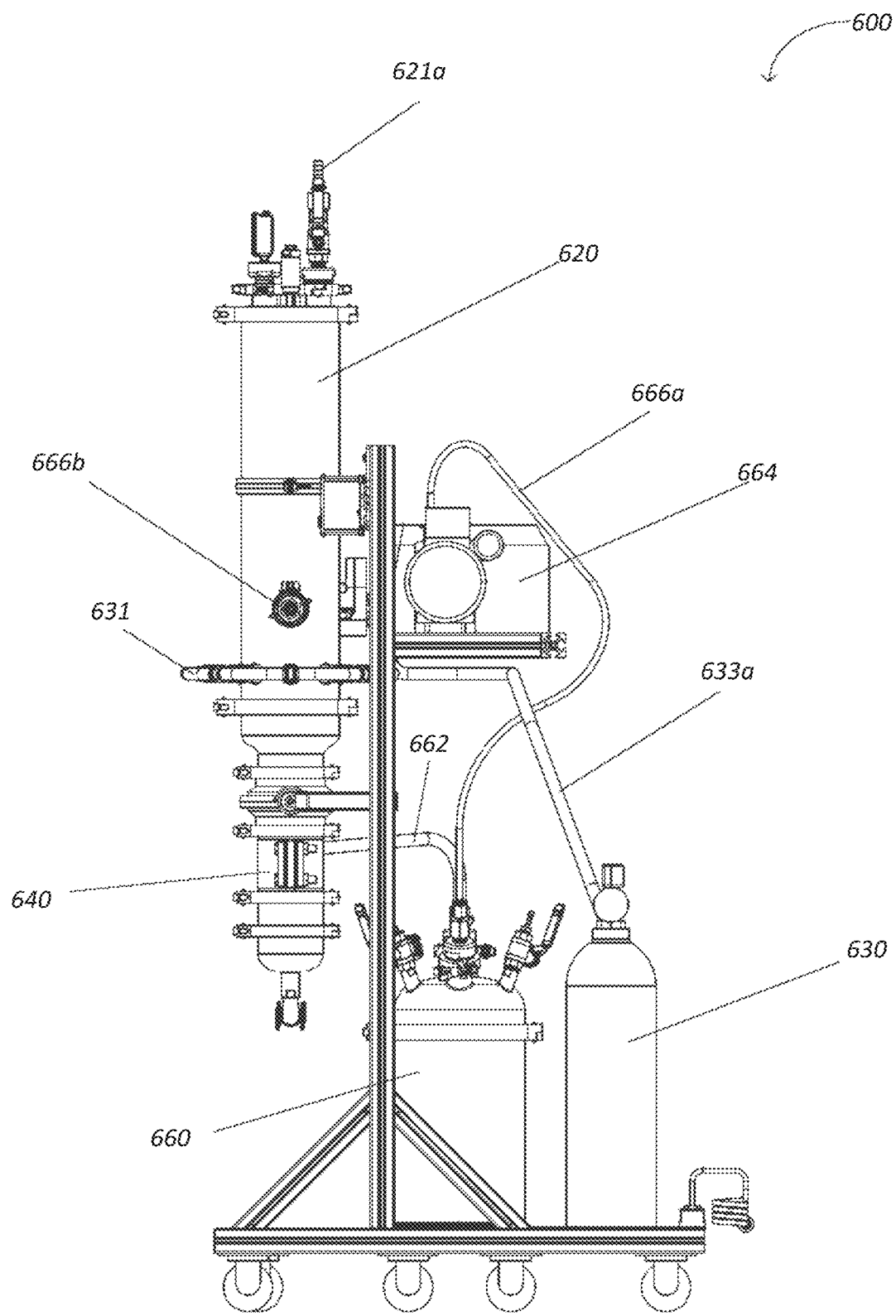
Figure 6E:
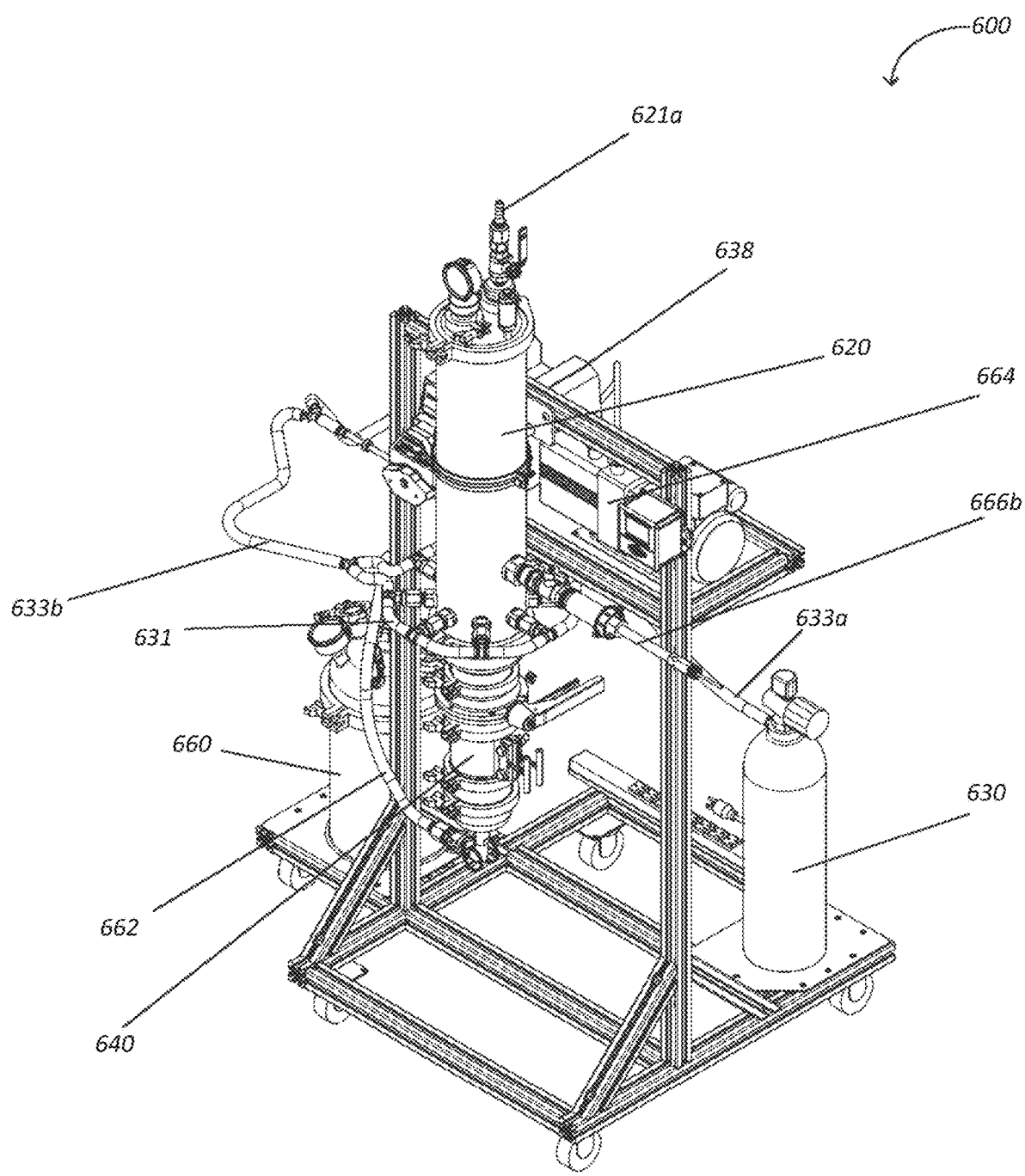
Figure 6F:
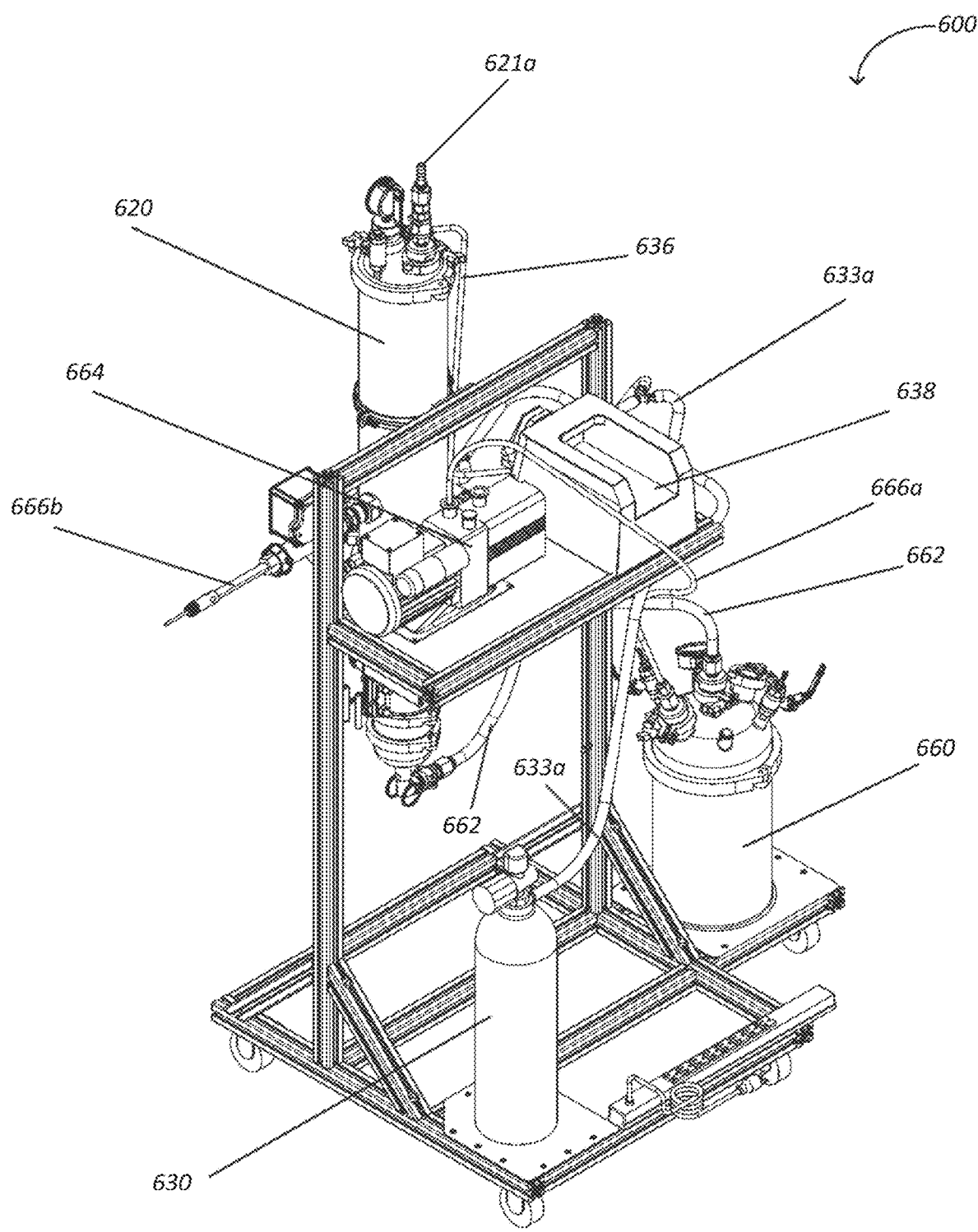

The system 500 can include a solution tank 510, a separation module 520, a gas tank 530, a collection region 523, and a collection cell 540. The separation module 520 can include a container 521 in fluid communication with the solution tank 510 via a tube 511. As shown in FIGS. 5C-5D, the container can include different configurations. For example, the containers shown in FIGS. 5C and 5D can include different sizes. Both containers 521, 521' can include collection regions (523, 523') and be in fluid communication with a gas tank (530, 530') via a tube (533, 533'). The solution tank 510 can receive a supersaturated solution (e.g., supersaturated Lithium solution). The supersaturated solution can come from the treatment of, for example, raw clay (e.g., raw Zeolite clay), as will be further described below. In some cases, the supersaturated solution can be introduced into the separation module 520 where the gas tank 530 can inject the supersaturated solution with a gas (e.g., CO2). Injecting the supersaturated solution with a gas can cause at least a portion of the solution to crystallize. The crystallized portion of the supersaturated solution can accumulate in the collection region 540 which can be positioned adjacent to the separation module 520. A moving arm 541 in fluid communication with the collection region 523 of the separation module 520 can facilitate collection of the crystallized portion of the supersaturated solution from the collection region 523 to the collection cell 540. The collection cell 540 can be used to store crystallized solution and prevent the collection region 523 from overfilling and/or clogging. The non-crystallized portion of the supersaturated solution can be further processed using an osmosis system 550. The osmosis system can remove chemicals such as metal ions and aqueous salts from the non-crystallized portion of the supersaturated solution and reduce the concentration of other chemicals such as magnesium. The osmosis system 550 can yield, for example, clean fresh water 551 and salt wastewater 552.

Although reference to raw Zeolite clay is made throughout the disclosure, other types of clay can be treated to produce a supersaturated solution. Raw Zeolite clay containing Lithium (Li), and other chemicals, can be processed to create a super saturated Lithium solution. In some cases, lithium metal (2Li) can be used. The raw Zeolite clay can be crushed to a smaller size to create a powder. The crushed raw Zeolite clay can be placed in a container and kept in a constant state of agitation by, for example, a spinning magnet or conventional mechanical means. The crushed raw Zeolite clay can be kept in constant agitation thus keeping the lithium clay of the raw zeolite clay in suspension. The container can be filled with a solution and mixed with the Lithium clay. The solution can comprise water (H2O). In some cases, the water can be treated using a reverse osmosis system before being added to the container. In some cases, salt variants, such as potassium chloride or sodium chloride, can also be added to the water after the water has been treated by the reverse osmosis system. The addition of the salt variants to the water can beneficially aid in the extraction of lithium. Adding water to the Lithium clay can create a slurry. The slurry can be kept in a constant state of agitation to keep the slurry consistency uniform throughout the treatment process. In some cases, the container containing the slurry can be pressurized. Once the slurry is mixed, it can be introduced into a separator. In some cases, the separator can comprise a separator like centrifuge 100 or centrifuge 200. The separator can use a combination of centrifugal forces, variable pitch acoustic induction, and/or injection of air, to separate Lithium clay while forcing at least a portion of dissolvable minerals and metals into the water. The resulting composition after the slurry is introduced into the separator can comprise lithium hydroxide (2LiOH) and water (H2O). The lithium hydroxide and the water can be further processed separately.

After leaving the separator, the lithium hydroxide (2LiOH) and any remaining water (H2O) can go through a drying process using a centrifugal dryer where at least a portion of the remaining water is removed. In some cases, the remaining water is separated from the lithium hydroxide using conventional separation methods such as decantation. The solution comprising lithium hydroxide and any remaining water can be recirculated through a second separator to further separate Lithium clay while forcing at least a portion of dissolvable minerals and metals into the water. The solution can be circulated through one or more separators until the solution is at a maximum saturation volume of lithium thereby creating a supersaturated Lithium solution (e.g., 2LiOH+H2O). In some cases, the supersaturated Lithium solution can comprise about 45 g of lithium for every 5.67 L of water.

In some cases, the super saturated Lithium solution can be obtained by mixing a lithium metal (2Li) with water (H2O). The Lithium can be crushed prior to being mixed with the water. In some cases, deionized water can be used. As the lithium metal is mixed with the water, hydrogen (H2) separates from the solution and the lithium metal dissolves into the water thereby creating lithium hydroxide (2LiOH) and hydrogen (H2).

The supersaturated Lithium solution can be introduced to the solution tank 510 of the system 500. The solution tank 510 can store the supersaturated Lithium solution before the supersaturated solution flows to the separation module 520 via tube 511. As shown in F Gravity can cause the supersaturated Lithium solution to flow from a top portion of the container 521 to a bottom portion of the container 521. While in the container 521, the supersaturated Lithium solution can be injected with a gas thereby crystallizing at least a portion of the supersaturated solution. The gas tank 530 can store the gas. The separation module 520 can include a plurality of injection ports 531 in fluid communication with the gas tank 530 via a tube 533, as shown in FIG. 5B. The plurality of injection ports 531 can allow the gas from the gas tank 530 to flow through the container 521 of the separation module 520. Because gravity can cause the supersaturated Lithium solution to accumulate on a bottom portion of the separation module 520, the plurality of injection ports 531 can be located on a bottom portion of the separation module 520 to maximize the contact between the supersaturated Lithium solution and the gas. The gas tank 530 can store the gas and include a gas delivery line 533 for delivering the gas from the gas tank 530 to the separation module 520.

The gas can comprise a gas containing carbon. In some cases, carbon dioxide ($CO_2$) or compressed air which naturally contains at least 0.04% carbon dioxide can be used as gases. The gas can cause the lithium contained in the supersaturated lithium solution to crystallize. The reaction between the super saturated lithium solution containing lithium hydroxide ($2LiOH$) and carbon dioxide ($CO_2$) can yield lithium carbonate ($Li_2CO_3$) and water ($H_2O$). Because the lithium contained in the supersaturated Lithium solution is not exposed to air during the separation process, the separation process does not produce any waste in the form of lithium oxide ($Li_2O$) which is harmful to humans.

The crystallized lithium carbonate can be collected by a filter of the collection region 523. In some cases, the filter can include a 140 μm metal mesh filter and/or a 20-25 μm filter paper. The filter can capture the lithium carbonate while allowing at least a portion remaining liquid solution (e.g., the non-crystallized portion of the supersaturated solution) to exit the separation module 520. After exiting the separation module 520, the liquid solution can go through an osmosis filtration treatment using osmosis system 550. The osmosis system 550 can remove chemicals from the water including, but not limited to, magnesium. Water treated by the osmosis system 550 can be returned to a container where it can be used to treat additional raw Zeolite clay. The system can recover at least at least 65% and or less than 90%, at least 70% and or less than 85%, and/or at least 75% and or less than 78.15% of the lithium contained in the raw Zeolite clay.

In some cases, the gas-treated solution can go through additional cycles on the system 500 or similar systems. For example, the gas-treated solution can contain at least some lithium hydroxide than can be crystallized by flowing the gas-treated solution through the system 500 or an additional system for injecting a gas. The system 500 and the additional system can be connected in series or in parallel. In some cases, the liquid solution can be collected in a tank before passing through the system 500 again or any additional system.

In some cases, the system 500 can include one or more pH sensors and/or indicators (e.g., pH indicator, pH meter) to indicate and/or measure the amount of alkalinity and acidity of the solutions flowing through the system 500. Beneficially, the readings of the pH sensors can provide an indication of the composition of the solutions during the various stages of the separation process. For example, a pH reading of the solution after the treatment of the raw Zeolite clay can provide an indication about the concentration of Lithium within the solution. This indication can beneficially inform whether the solution has achieved a supersaturated concentration.

In some cases, the pH sensor can provide an indication of the Lithium content of the solution after the solution is injected with the gas (e.g., $CO_2$). The color, or changes thereof, of the solution can provide an indication of the lithium crystallization process. In some cases, the color of the solution can change when gas is injected to the solution. For example, the solution can be pigmented with a color (e.g., pink) that vanishes when the solution is injected with gas thereby changing the color of the solution (e.g., from pink to clear). In some cases, the solution can change from clear to colored when the gas is injected to the solution. The solution's change of color can provide an indication of changes in pH of the solution and therefore of the composition of the solutions during the various stages of the separation process.

Another embodiment of a system for separating minerals using a gas injection module is shown in FIGS. 6A-6F.

The system 600 can include a separation module 620, a gas tank 630, and a collection region 640. The system 600 can be in fluid communication with a solution tank (not shown). The solution tank can receive a supersaturated solution (e.g., supersaturated Lithium solution). The supersaturated solution can come from the treatment of, for example, raw clay (e.g., raw Zeolite clay), as will be further described below. In some cases, the supersaturated solution can be introduced into the separation module 620 via line 621*a* where an injection ring 631 in fluid communication with the gas tank 630 can inject the supersaturated solution with a gas (e.g., $CO_2$). Injecting the supersaturated solution with a gas can cause at least a portion of the solution to crystallize. The crystallized portion of the supersaturated solution can accumulate in the collection region 640 which can be positioned on a bottom region of the separation module 620. The non-crystallized portion of the supersaturated solution can be further processed using an osmosis system (not shown). The osmosis system can remove chemicals such as metal ions and aqueous salts from the non-crystallized portion of the supersaturated solution and reduce the concentration of other chemicals such as magnesium. The osmosis system can yield, for example, clean fresh water and salt wastewater.

Although reference to raw Zeolite clay is made throughout the disclosure, other types of clay can be treated to produce a supersaturated solution. Raw Zeolite clay containing Lithium (Li), and other chemicals, can be processed to create a super saturated Lithium solution. In some cases, lithium metal ($2Li$) can be used. The raw Zeolite clay can be crushed to a smaller size to create a powder. The crushed raw Zeolite clay can be placed in a container and kept in a constant state of agitation by, for example, a spinning magnet or conventional mechanical means. The crushed raw Zeolite clay can be kept in constant agitation thus keeping the lithium clay of the raw zeolite clay in suspension. The container can be filled with a solution and mixed with the Lithium clay. The solution can comprise water ($H_2O$). In some cases, the water can be treated using a reverse osmosis system before being added to the container. In some cases, salt variants, such as potassium chloride or sodium chloride, can also be added to the water after the water has been treated by the reverse osmosis system. The addition of the salt variants to the water can beneficially aid in the extraction of lithium. Adding water to the Lithium clay can create a slurry. The slurry can be kept in a constant state of agitation to keep the slurry consistency uniform throughout the treatment process. In some cases, the container containing the slurry can be pressurized. Once the slurry is mixed, it can be introduced into a separator. In some cases, the separator can comprise a separator like centrifuge 100 or centrifuge 200. The separator can use a combination of centrifugal forces, variable pitch acoustic induction, and/or injection of air, to separate Lithium clay while forcing at least a portion of dissolvable minerals and metals into the water. The resulting composition after the slurry is introduced into the separator can comprise lithium hydroxide (2LiOH) and water (H2O). The lithium hydroxide and the water can be further processed separately.

After leaving the separator, the lithium hydroxide (2LiOH) and any remaining water (H2O) can go through a drying process using a centrifugal dryer where at least a portion of the remaining water is removed. In some cases, the remaining water is separated from the lithium hydroxide using conventional separation methods such as decantation. The solution comprising lithium hydroxide and any remaining water can be recirculated through a second separator to further separate Lithium clay while forcing at least a portion of dissolvable minerals and metals into the water. The solution can be circulated through one or more separators until the solution is at a maximum saturation volume of lithium thereby creating a supersaturated Lithium solution (e.g., 2LiOH+H2O). In some cases, the supersaturated Lithium solution can comprise about 45 g of lithium for every 5.67 L of water.

In some cases, the super saturated Lithium solution can be obtained by mixing a lithium metal (2Li) with water (H2O). The Lithium can be crushed prior to being mixed with the water. In some cases, deionized water can be used. As the lithium metal is mixed with the water, hydrogen (H2) separates from the solution and the lithium metal dissolves into the water thereby creating lithium hydroxide (2LiOH) and hydrogen (H2).

The supersaturated Lithium solution can be introduced to the solution tank of the system 600. The solution tank can store the supersaturated Lithium solution before the supersaturated solution flows to the separation module 620 via line 621*a*. Gravity can cause the supersaturated Lithium solution to flow from a top portion of the separation module 620 to a bottom portion of the separation module 620. While in the separation module 620, the supersaturated Lithium solution can be injected with a gas thereby allowing at least a portion of the supersaturated solution to crystallize. A plurality of lines 633*a*, 633*b* in fluid communication with the gas tank 630 can be used to flow the gas from the gas tank 630 to the injection ring 631 and inject the gas into the separation module 620. Because gravity can cause the supersaturated Lithium solution to accumulate on a bottom portion of the separation module 620, the injection ring 631 can be located on a bottom portion of the separation module 620 to maximize the contact between the supersaturated Lithium solution and the gas.

In some cases, the system 600 can include a recirculation line 636 for recirculating at least a portion of the gas from the separation module 620 to a pump 638 and line 633*b*. The pump 638 can be in fluid communication with lines 633*a*, 633*b* and facilitate recirculation of the gas. The pump 638 can provide negative pressure to the separation module 620 via recirculation line 636. The tank 630, gas delivery lines 633*a*, 633*b*, injection ring 631, and recirculation line 636 can form a closed loop system where the gas either crystallizes the supersaturated Lithium solution or flows through the recirculation line 636 to be recirculated using gas delivery lines 633*a*, 633*b* and injected into the separation module via injection ring 631.

The gas can comprise a gas containing carbon. In some cases, carbon dioxide (CO2) or compressed air which naturally contains at least 0.04% carbon dioxide can be used as gases. The gas can cause the lithium contained in the supersaturated lithium solution to crystallize. The reaction between the super saturated lithium solution containing lithium hydroxide (2LiOH) and carbon dioxide (CO2) can yield lithium carbonate (Li2CO3) and water (H2O). Because the lithium contained in the supersaturated Lithium solution is not exposed to air during the separation process, the separation process does not produce any waste in the form of lithium oxide (Li2O) which is harmful to humans.

The crystallized lithium carbonate can be collected by a filter (not shown) of the collection region 640. In some cases, the filter can include a 140 μm metal mesh filter and/or a 20-25 μm filter paper. The filter can capture the lithium carbonate while allowing fluids (e.g., the non-crystallized portion of the supersaturated solution) to exit the separation module 620. After exiting the separation module 620, the water can go through an osmosis filtration treatment using osmosis system (not shown). In some cases, the non-crystallized fluids can be collected in a tank 660 before passing though the osmosis system. The water can flow from the separation module 620 to the tank 660 via a line 662. The osmosis system can be located downstream of a line in fluid communication with the tank 660. A pump 664 can be in fluid communication with the tank 660 via line 666*a* and facilitate flowing the non-crystallized fluids from the separation module 620 to the tank 660. The pump 664 can provide negative pressure to the tank 660 via line 666*a*. The osmosis system can remove chemicals from the water including, but not limited to, magnesium. Fluids processed by the osmosis system can be returned to the container where it can be used to treat the raw Zeolite clay. The system can recover at least 78.15% of the lithium contained in the raw Zeolite clay.

In some cases, the gas-treated solution can go through additional cycles on the system 600 or similar systems. For example, the gas-treated solution can contain at least some lithium hydroxide than can be crystallized by flowing the gas-treated solution through the system 600 or an additional system for injecting a gas. The system 600 and any additional system can be connected in series or in parallel. In some cases, the water can be collected in tank 660 before passing through the system 600 or any additional system again.

In some cases, the system 600 can include one or more pH sensors and/or indicators (e.g., pH indicator, pH meter) to measure the amount of alkalinity and acidity of the solutions flowing through the system 600. Beneficially, the readings of the pH sensors can provide an indication of the composition of the solutions during the various stages of the separation process. For example, a pH reading of the solution after the treatment of the raw Zeolite clay can provide an indication about the concentration of Lithium within the solution. This indication can beneficially inform whether the solution has achieved a supersaturated concentration.

In some cases, the pH sensor can provide an indication of the Lithium content of the solution after the solution is injected with the gas (e.g., CO2). The color, or changes thereof, of the solution can provide an indication of the lithium crystallization process. In some cases, the color of the solution can change when gas is injected to the solution. For example, the solution can be pigmented with a color (e.g., pink) that vanishes when the solution is injected with gas thereby changing the color of the solution (e.g., from pink to clear). In some cases, the solution can change from clear to colored when the gas is injected to the solution. The solution's change of color can provide an indication of changes in pH of the solution and therefore of the composition of the solutions during the various stages of the separation process.

Figure 7:
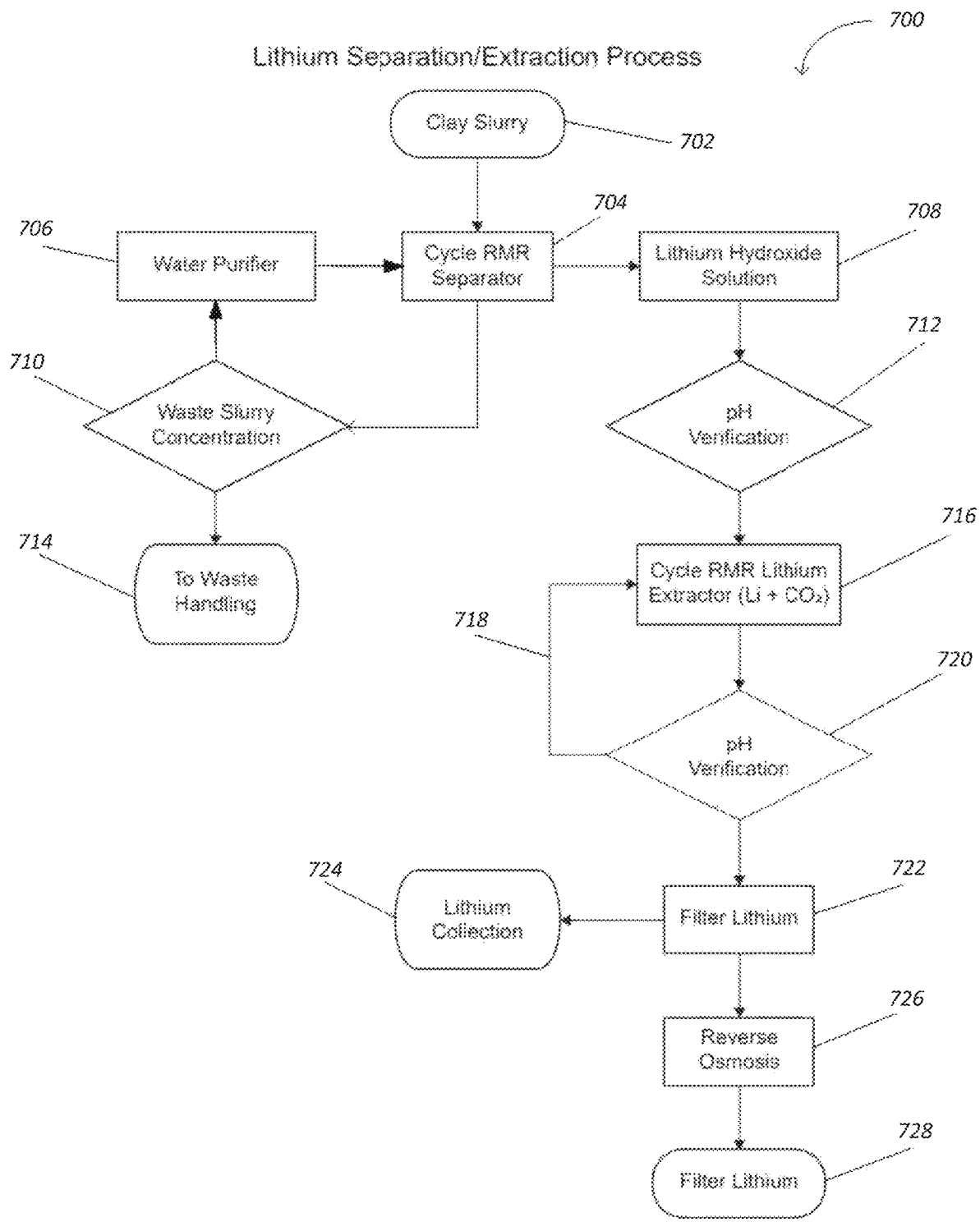
FIG. 7 is a process flow diagram of an example system for separating a mineral from a clay using a gas injection module.

FIG. 7 is a process flow diagram of an example method 700 for separating minerals using a gas injection module. The method 700 may be performed, for example, by system 500, 600 described herein.

At block 702, materials may be obtained for processing in the system. As discussed herein, the materials can include a clay slurry such as raw Zeolite clay containing Lithium (Li). Additionally, the materials may be ground, screened, or otherwise processed in preparation for separation in the system. As an example, the materials may be processed to have a suitable particle size.

At block 704, the materials can be processed using a cycle RMR separator. The materials, such as the raw Zeolite clay, can be crushed to a smaller size to create a powder. The crushed materials can be placed in a container and kept in a constant state of agitation by, for example, a spinning magnet or conventional mechanical means. The crushed materials can be kept in constant agitation thus keeping the lithium clay of the raw zeolite clay in suspension. The container can be filled with a solution and mixed with the Lithium clay. The solution can comprise water ($H_2O$). In some cases, the water can be treated using a reverse osmosis (RO) system before being added to the container. Adding water to the Lithium slurry can create a slurry. The chemical reaction between the (RO) water and the lithium slurry can result in the slurry reaching or almost reaching a boiling point. The slurry can be kept in a constant state of agitation to keep the slurry consistency uniform throughout the treatment process. In some cases, the container containing the slurry can be pressurized.

In some embodiments, once the slurry is mixed, it can be introduced into a separator. In some cases, the separator can comprise a separator like centrifuge 100 or centrifuge 200. The separator can use a combination of centrifugal forces, variable pitch acoustic induction, and/or injection of air, to separate Lithium clay while forcing at least a portion of dissolvable minerals and metals into the water. The resulting composition after the slurry is introduced into the separator can comprise a supersaturated lithium hydroxide ($2LiOH$) solution, as shown in block 708, and water ($H_2O$). The supersaturated lithium hydroxide solution and the water can be further processed separately. For example, the water can be mixed with a waste slurry, as shown in block 710, processed by a water purifier, as shown in block 706, and recirculated to the RMR separator, as shown in block 704 or disposed to waste handling, as shown in block 714.

At block 712, the pH of the supersaturated lithium hydroxide solution can be verified. In some embodiments, the pH of the lithium hydroxide solution can be verified using one or more pH sensors. Beneficially, the readings of the pH sensors can provide an indication of the composition of the lithium hydroxide. For example, a pH reading of the lithium hydroxide solution at block 712 can provide an indication of the concentration of Lithium within the lithium hydroxide solution. This indication can beneficially inform whether the solution has achieved a supersaturated concentration.

At block 716, the supersaturated lithium hydroxide solution can be injected with a gas. For example, the supersaturated Lithium solution can be introduced to a solution tank, such as tank 510 of the system 500. The solution tank can store the supersaturated Lithium solution before the supersaturated solution flows to a separation module such as separation module 520 of the system 500. The force of gravity can cause the supersaturated Lithium solution to flow from a top portion of the separation module to a bottom portion of the separation module. While in the separation module, the supersaturated Lithium solution can be injected with a gas thereby allowing at least a portion of the supersaturated solution to crystallize. The gas can comprise a gas containing carbon. In some cases, carbon dioxide ($CO_2$) and/or compressed air which naturally contains at least 0.04% carbon dioxide can be used as gases. The reaction between the super saturated lithium solution containing lithium hydroxide ($2LiOH$) and the carbon dioxide ($CO_2$) can yield lithium carbonate ($Li_2CO_3$) and water ($H_2O$).

A gas tank can be used to supply gas to the separation module. The separation module can include a plurality of injection ports in fluid communication with the gas tank. The plurality of injection ports can allow the gas from the gas tank to flow to the separation module. Because gravitational force can cause the supersaturated Lithium solution to accumulate on a bottom portion of the separation module, the plurality of injection ports can be located on a bottom portion of the separation module to maximize the contact between the supersaturated Lithium solution and the gas. The gas tank can store the gas and include a gas delivery line for delivering the gas from the gas tank to the separation module.

In some cases, a recirculation line can recirculate at least a portion of the gas inside the separation module to the delivery line. In some cases, a pump in fluid communication with the recirculation line and the delivery line can facilitate recirculation of the gas. The pump can provide negative pressure to the separation module via pressure line. The tank, gas delivery line, and recirculation line can form a closed loop system where the gas either crystalizes the supersaturated Lithium solution or flows through the recirculation line to be recirculated using gas delivery line. At block 712, the pH of the supersaturated lithium hydroxide solution can be verified again. For example, a pH sensor reading can provide an indication of the Lithium content of the supersaturated solution after the supersaturated solution is injected with a gas (e.g., $CO_2$). As noted by arrow 618, more gas can be injected to the supersaturated solution if the pH reading provides an indication that the supersaturated solution contains lithium hydroxide beyond a threshold value.

At block 722, the crystallized lithium carbonate ($Li_2CO_3$) can be filtered from the water ($H_2O$). The crystallized lithium carbonate can be collected in a lithium collection region as shown in block 724. The water ($H_2O$) and any non-crystallized lithium can be further processed as shown in blocks 726 and 728. For example, the water can be processed using an osmosis system. The osmosis system can remove chemicals such as metal ions and aqueous salts from the non-crystallized portion of the supersaturated solution and reduce the concentration of other chemicals such as magnesium. The osmosis system can yield, for example, clean fresh water and salt wastewater. The clean fresh water and salt water can be further filtered to remove at least a portion of any remaining lithium, as shown in block 728.

Figure 8:
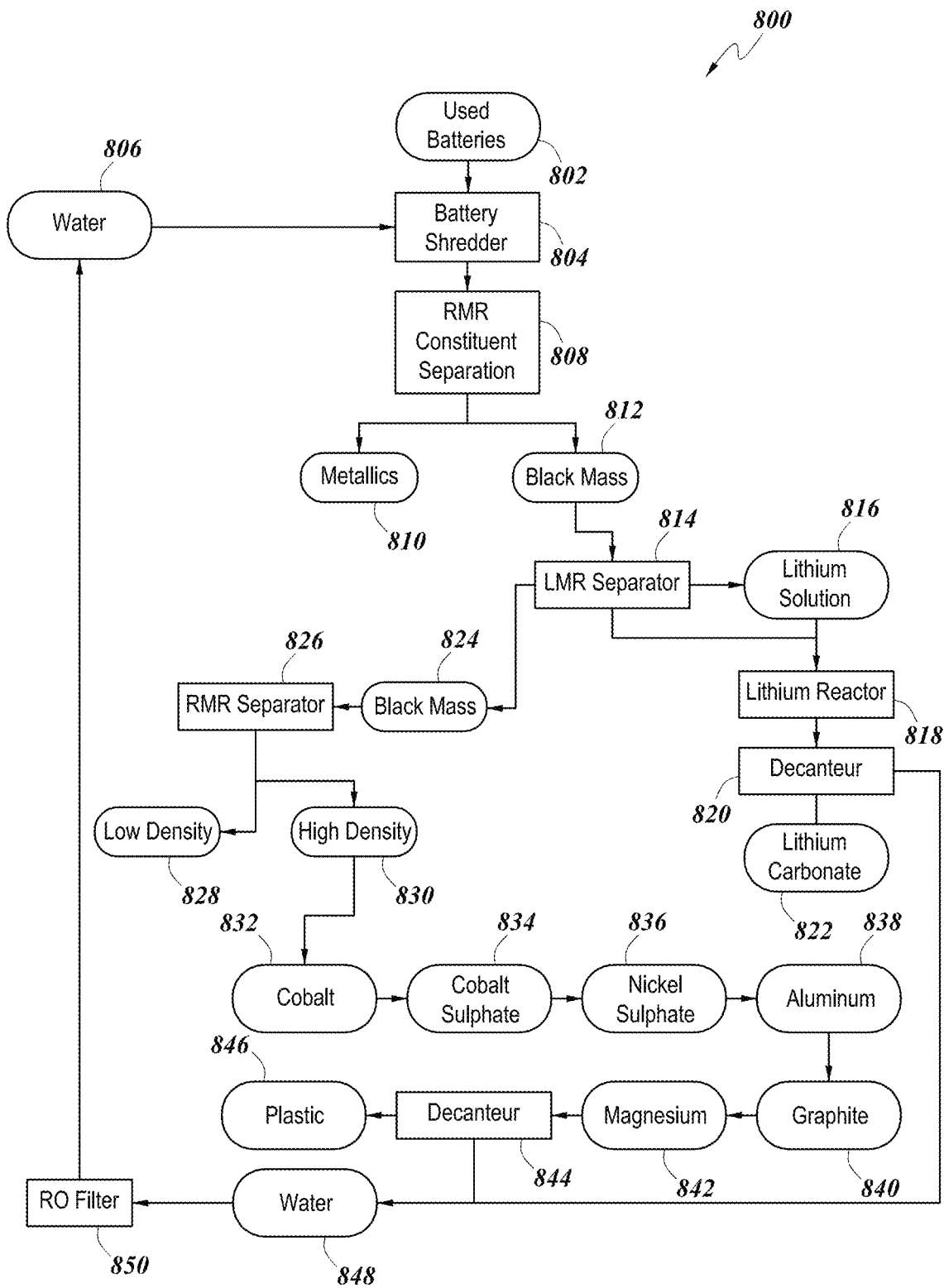
FIG. 8 is a process flow diagram of an example method for recovering minerals.

FIG. 8 is a process flow diagram of an example method 800 for recovering minerals. The method can be performed, for example, by system 500, 600 described herein. At block 802, materials may be obtained for processing in the system. As discussed herein, the materials can include used batteries (e.g., car batteries, battery cells, etc.) and/or electronic components such as motherboards, hard drives, etc. The batteries can include minerals such as lithium, cobalt, cobalt sulphate, nickel sulphate, aluminum, graphite, magnesium, and/or plastic. Although reference is made to specific minerals, the method 800 can be used to recover other minerals. At block 804, the battery can be grinded, crushed, and/or shredded using conventional shredding methods. The battery can grinded, crushed, and/or shredded using a shredder and/or a granulator. The shredder and/or granulator can process at least about 6 metric tons of material per hour. The shredder and/or granulator can process more than or less than 6 metric tons of material per hour (e.g., 1, 2, 4, 8, 10, metric tons per hours). In some cases, the battery can be grinded, crushed, and/or shredded to about 60 mesh on a mesh scale (e.g., 250 μm). The battery can be grinded, crushed, and/or shredded to a size larger than or smaller than 60 mesh (e.g., 10, 20, 30, 40, 70, 80, 100, etc. mesh). The size of the resulting granules at block 804 can be increased and/or decreased by adjusting the operational settings of the shredder and/or granulator. The battery can also be submerged in a solution. The solution can include a water-based solution. At block 808, the shredded battery can be separated into metallics 810 and black mass 812. This step can be completed using a separator such as centrifuge 100 and/or 200. The resulting black mass 812 can include lithium, cobalt, cobalt sulphate, nickel sulphate, aluminum, graphite, and/or magnesium. The metallics 810 and black mass 812 can be separated by specific gravity.

At block 814, lithium can be separated from the black mass 812 using a separator, such as centrifuge 100 and/or 200. The resulting lithium can be added used to create a lithium solution 816. The lithium solution 816 can be similar to the supersaturated solution described in relation to process 700 of FIG. 7. At block 826, the resulting black mass 824 and the minerals contained therein can be separated into low density minerals 828 and high-density minerals 830. The low density minerals 828 and the high density minerals 830 can be separated by specific gravity using a separator such as centrifuge 100 and/or 200. In some cases, the order in which the high-density minerals 830 are separated is determined by their specific gravity. For example, higher-density minerals (e.g., cobalt) can be separated before lower-density minerals (e.g., magnesium). The high density minerals 830 can be separated using a separator such as centrifuge 100 and/or 200. At block 832, cobalt can be separated from the other minerals in the black mass. At block 834, cobalt sulphate can be separated from the other minerals in the black mass. At block 836, nickel sulphate can be separated from the other minerals in the black mass. At block 838, aluminum can be separated from the other minerals in the black mass. At block 842, magnesium can be separated from the other minerals in the black mass. At block 844, any remaining solids, such as plastic 846, can be separated using a decanter. Any remaining liquids, such as water 848, can go through a filtration system, as shown in block 850. The filtration system can include a reverses osmosis system, such as reverse osmosis system (RO) 550. The treated water 806 from the reverse osmosis system can be reused. For example, the treated water 806 can be used to submerge the battery at block 804.

At block 816, the lithium solution can be treated using a lithium reactor 818. The lithium reactor 818 can yield lithium carbonate 822. The lithium carbonate separation process of block 818 can be achieved using a process similar to that of process 700, as described with relation to FIG. 7. Among other things, the lithium reactor 818 can include a carbon infusion module that can inject a gas containing carbon into the supersaturated lithium solution. As described with relation to FIG. 7, the carbon-containing gas can crystallize the lithium of the supersaturated lithium solution. The crystallized lithium (e.g., lithium carbonate 822) can be collected from a collection zone of the lithium reactor. A decanter can be used to separate the crystallized lithium from the liquid solution. Any remaining fluid can go through an additional treatment, such as reverse osmosis, at block 850.

Figure 9:
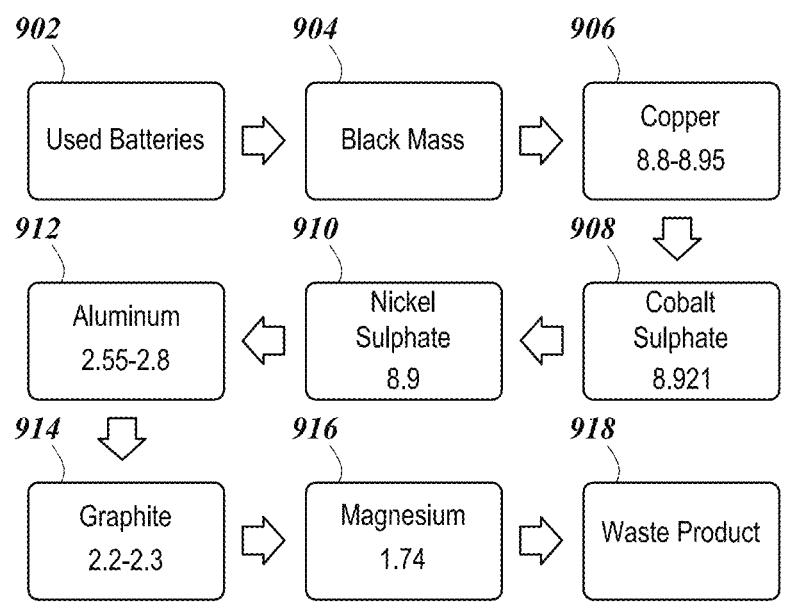
FIG. 9 is a process flow diagram of another example method for recovering minerals.

FIG. 9 is a process flow diagram of an example method 900 for recovering minerals. At block 902, materials may be obtained for processing in the system. The materials can include a car battery and/or battery cells. The materials, as described with relation to FIG. 8, can include lithium, cobalt, cobalt sulphate, nickel sulphate, aluminum, graphite, magnesium, and/or plastic. The minerals can be separated by specific gravity using a separator such as centrifuge 100 and/or 200. In some cases, each mineral is received by a separator. For example, a first separator can receive the minerals and separate a first mineral. A second separator can receive the tailings of the first separator and separate a second mineral. A third separator can receive the tailings of the second separator and separate a third mineral. The method 900 can include a separator for each mineral. The black mass can be obtained as described with relation to FIG. 8. At block 906, copper can be separated from the other minerals in the black mass. At block 908, cobalt sulphate can be separated from the other minerals in the black mass. At block 910, nickel sulphate can be separated from the other minerals in the black mass. At block 912, aluminum can be separated from the other minerals in the black mass. At block 914, graphite can be separated from the other minerals in the black mass. At block 916, magnesium can be separated from the other minerals in the black mass. In some cases, the order in which the minerals are separated is determined by their specific gravity. For example, higher-density minerals (e.g., copper) can be separated before lower-density minerals (e.g., magnesium). At block 918, any remaining materials (e.g., waste product) from the black mass can be disposed.

Figure 10A:
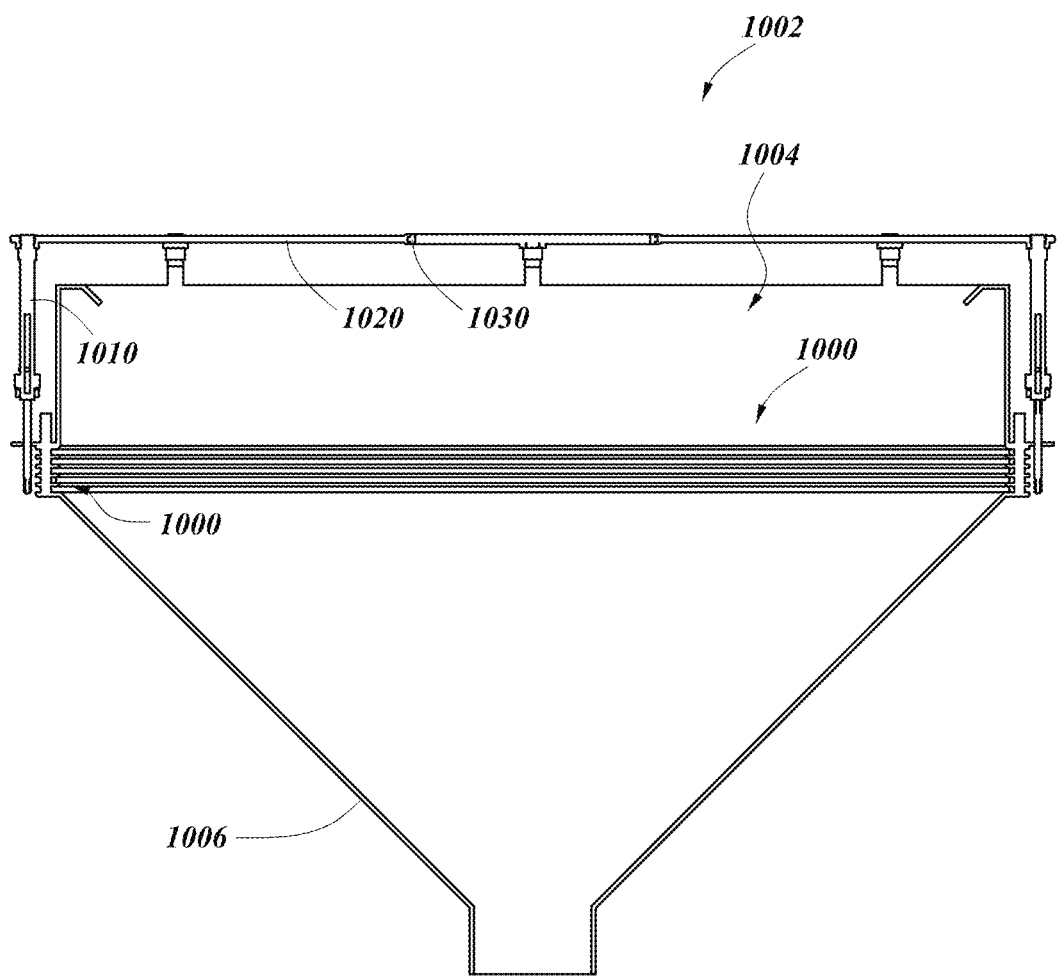
FIGS. 10A and 10B show an example embodiment of adjustable riffles for a separator.
Figure 10B:
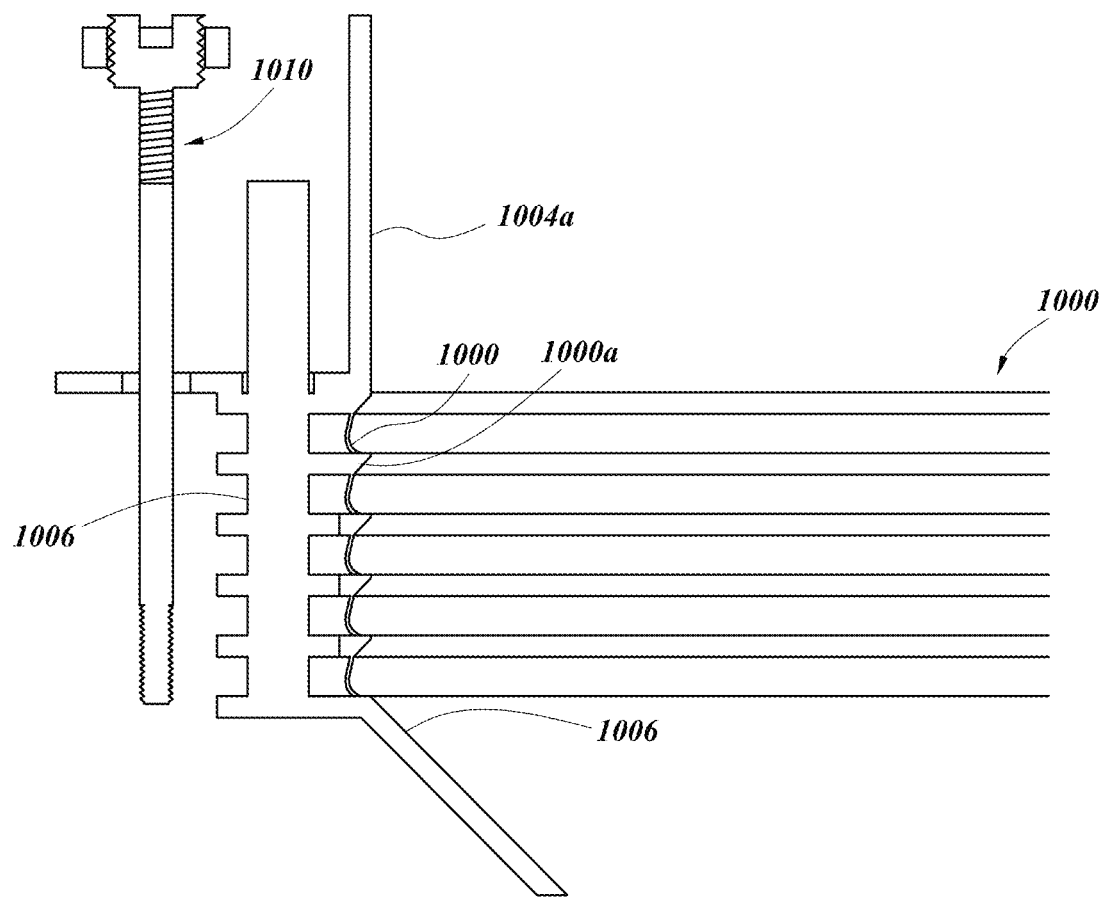

FIGS. 10A and 10B show an example embodiment of adjustable riffles 1000 for a separator. The adjustable riffles 1000 can be included in, for example, a centrifuge 100 and/or 200. The riffles can be positioned inside a centrifuge 1002, which can be similar or identical to the centrifuge 100 and/or 200. The adjustable riffles 1000 can include a linear actuator 1010, a tie rod plate 1020, and a rotational bearing 1030. For example, the adjustable riffles 1000 can be positioned adjacent a collection region 1004 of the centrifuge 1002 and above a drum ramp wall 1006 of the centrifuge 1002. The centrifuge 1002 can include a drain 1008 positioned downstream of the collection region 1004 and the drum ramp wall 1006. The collection region 1004 can include a collection wall 1004a. A plate 1000a and/or a tie rod 1000b can be positioned between each pair of adjustable riffles 1000, as shown in FIG. 10B.

The adjustable riffles 1000 can be adjusted using the linear actuator 1010. For example, the linear actuator 1010 can adjust the space between each individual riffle 1000. This can beneficially allow the separators to receive and collect minerals of various grind sizes, and accommodate solid carrier mediums of various sizes. The space between the riffles 1000 can be expanded to collect larger minerals and contracted to collect smaller minerals. The riffles 1000 can be adjusted while the separator is in operation.

Any of the systems and methods described herein can be operated and controlled using a controller. The controller can allow users to control operational parameters including, but not limited to, the rotation and rotation speed of the separators (e.g., centrifuge 100 and/or 200), counter-rotation, frequency of the rotation, oscillation speed, sound induction, and/or aeration of the fluids. This beneficially provides quick and efficient adjustment of the systems and methods thereby allowing for separation of multiple minerals and/or materials using the same separator.

Modular Mining System

Figure 11A:
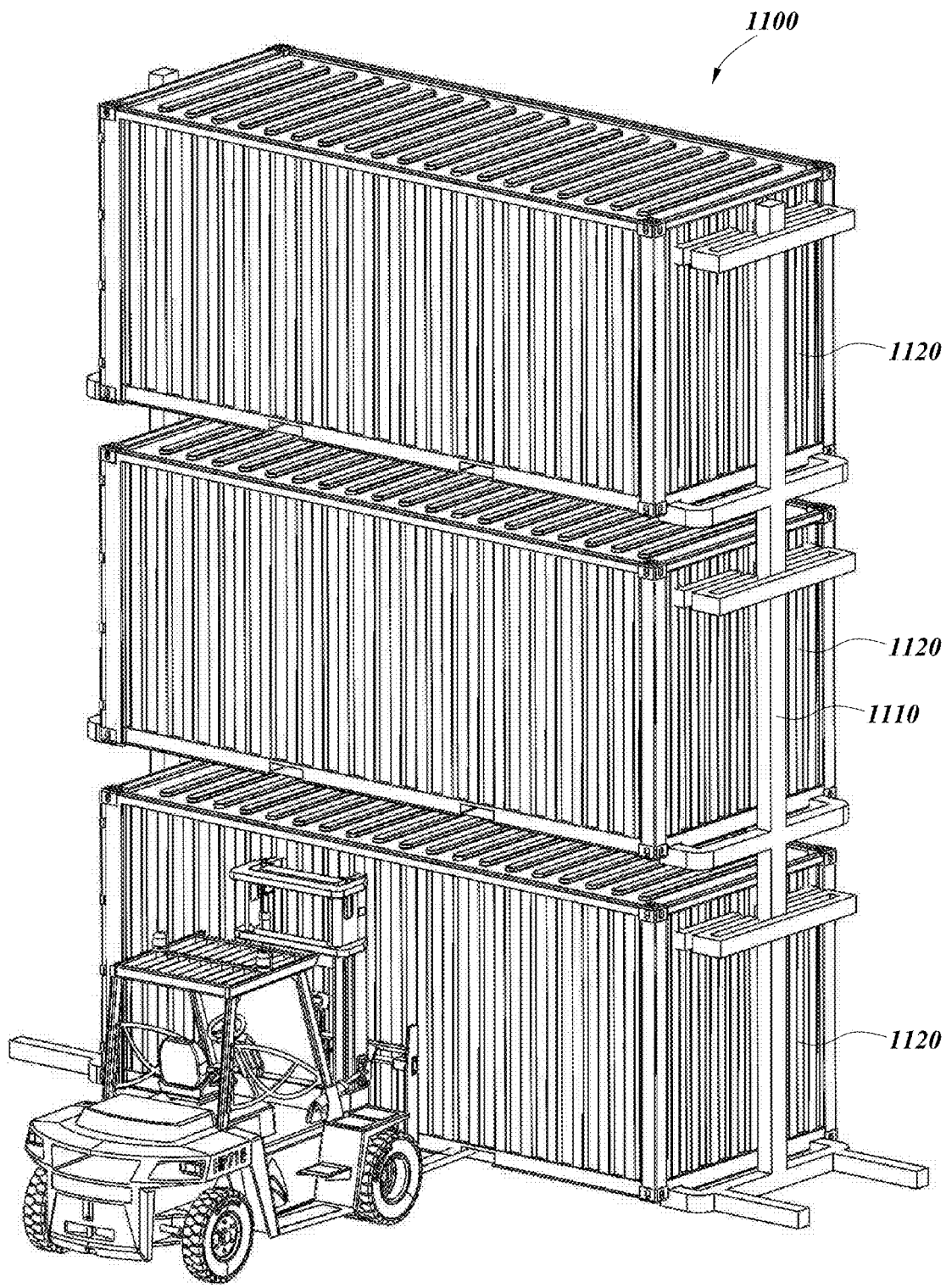
FIGS. 11A-11E show an example embodiment of a modular mining system.
Figure 11B:
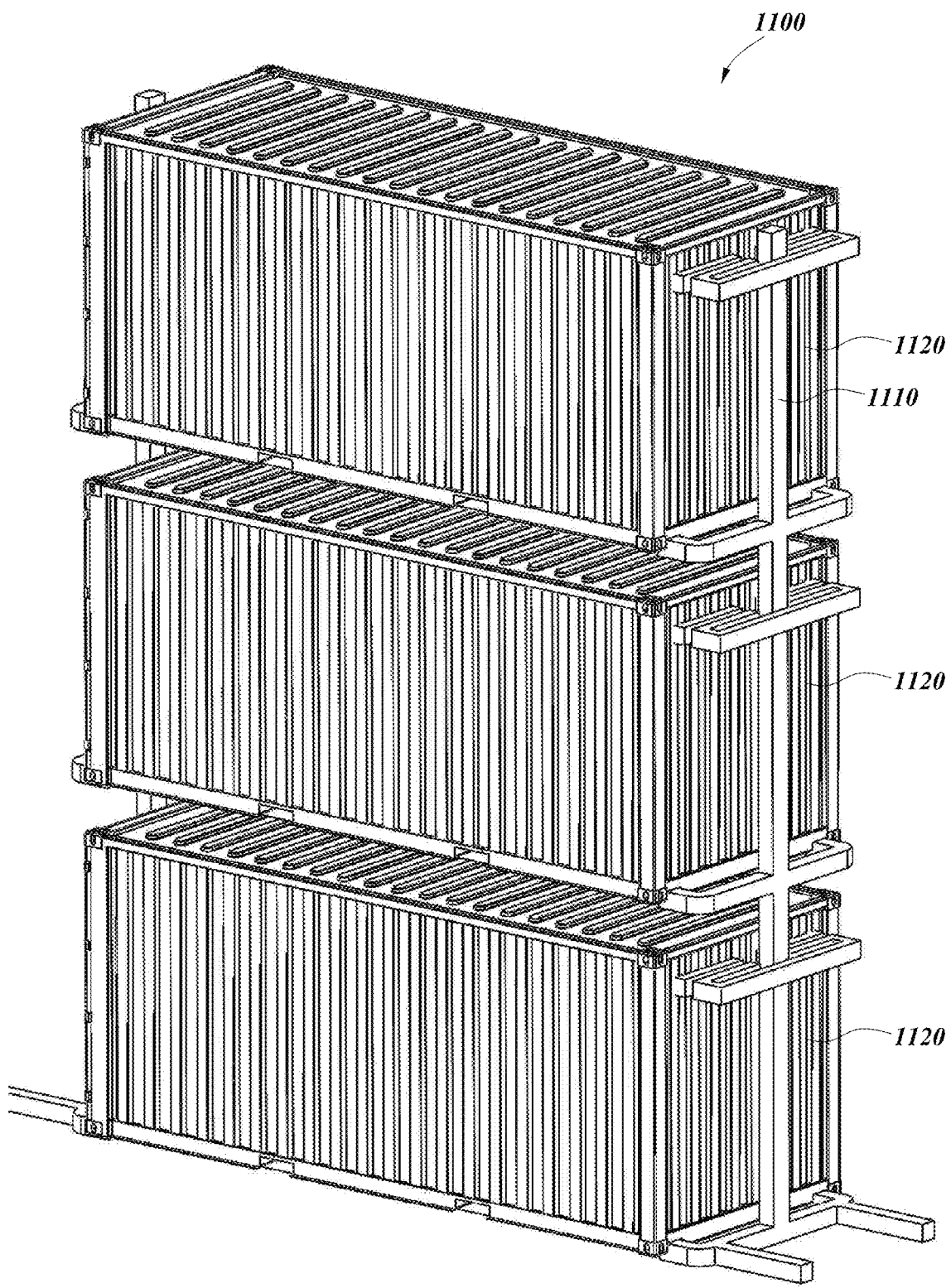
Figure 11C:
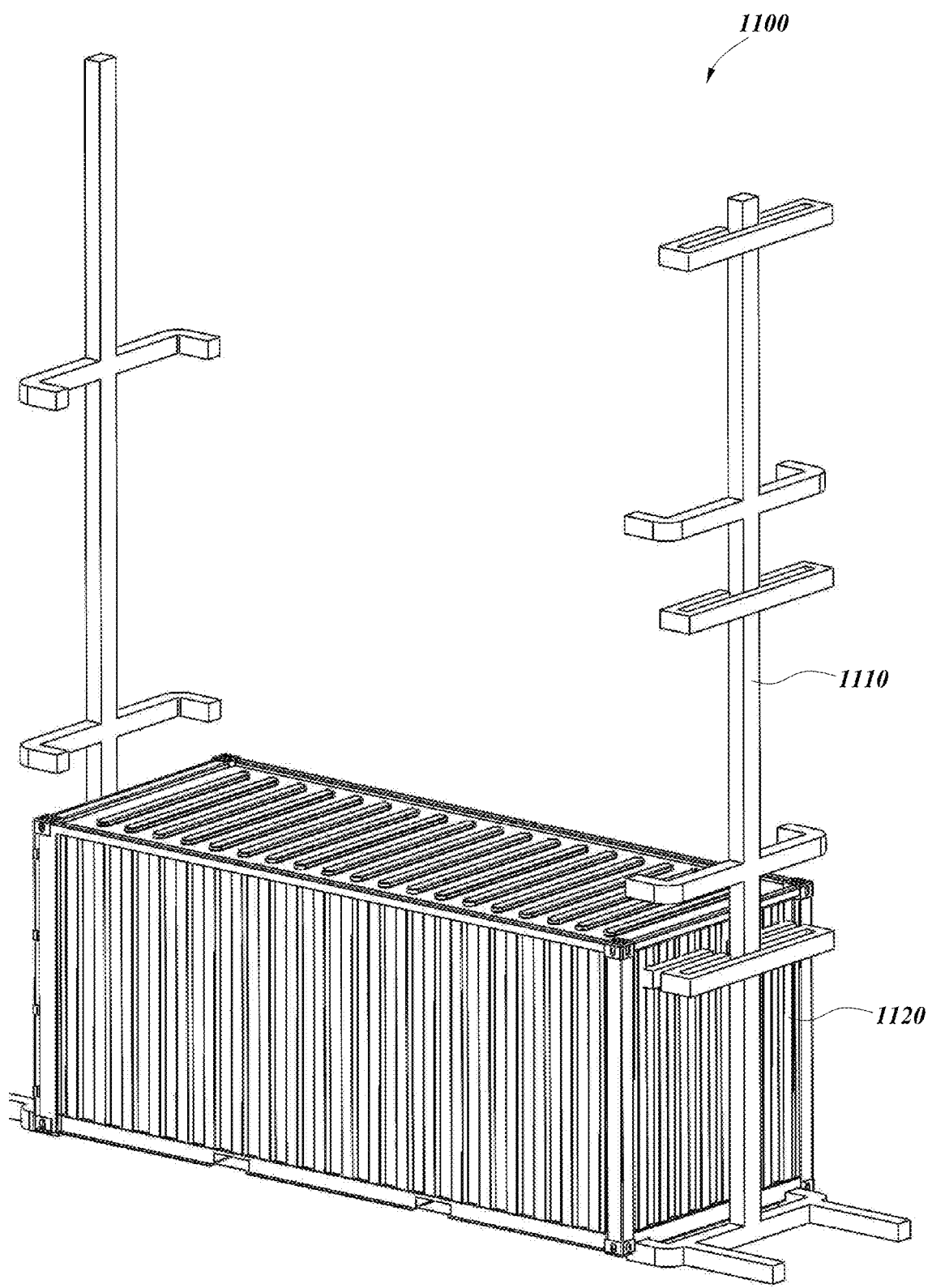

The systems described herein, including system 100, separator 200, and system 500, can be part of a modular mining system, as shown in FIGS. 11A-11C. The modular mining system can include one or more shipping containers. The one or more shipping containers can include stainless steel. Stainless steel is resistant to corrosion, alkaloid soils, and acid. This can beneficially allow the modular mining system to be implemented in mining operations where corrosion, alkaloid soils, and/or acid are present. Each shipping container can house one or more systems, such as system 100, separator 200, and system 500. Two or more shipping containers can be stacked (for example, up to five containers high) or coupled together to expand the mining system. Beneficially, systems can be added to or removed from the shipping containers depending on the mining needs and conditions. For example, a mining site survey can provide an indication of the mining conditions and/or minerals available for mining. Depending on the mining conditions and/or minerals available for mining, the one or more shipping containers can be fitted with different systems and or/components. As an example, if a mining site lacks access to a source of water, the modular mining system can include at least one shipping container with a source of water (e.g., tank of water). The one or more shipping containers can also be fitted with their own source of energy (e.g., power generators).

Figure 11D:
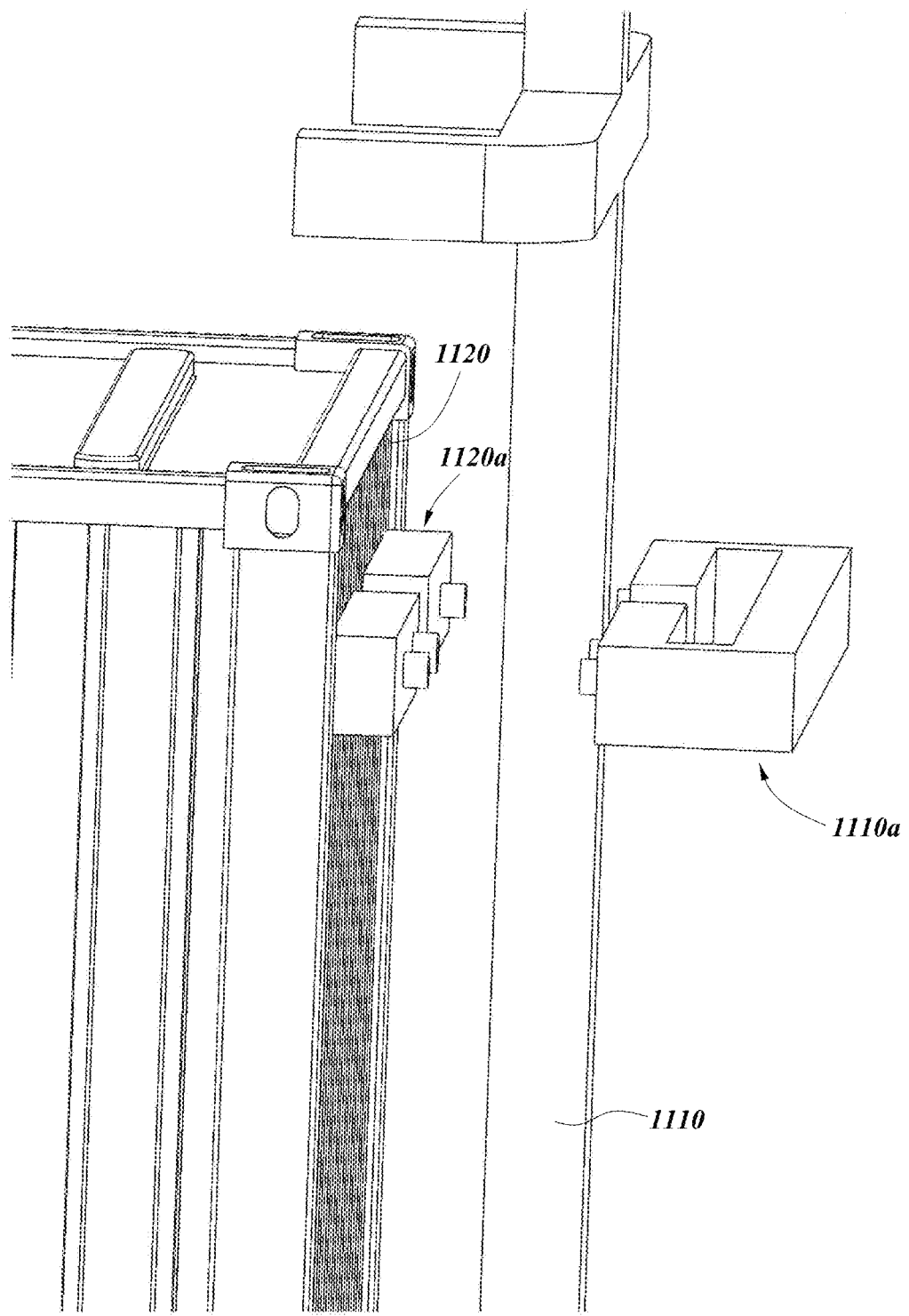
Figure 11E:
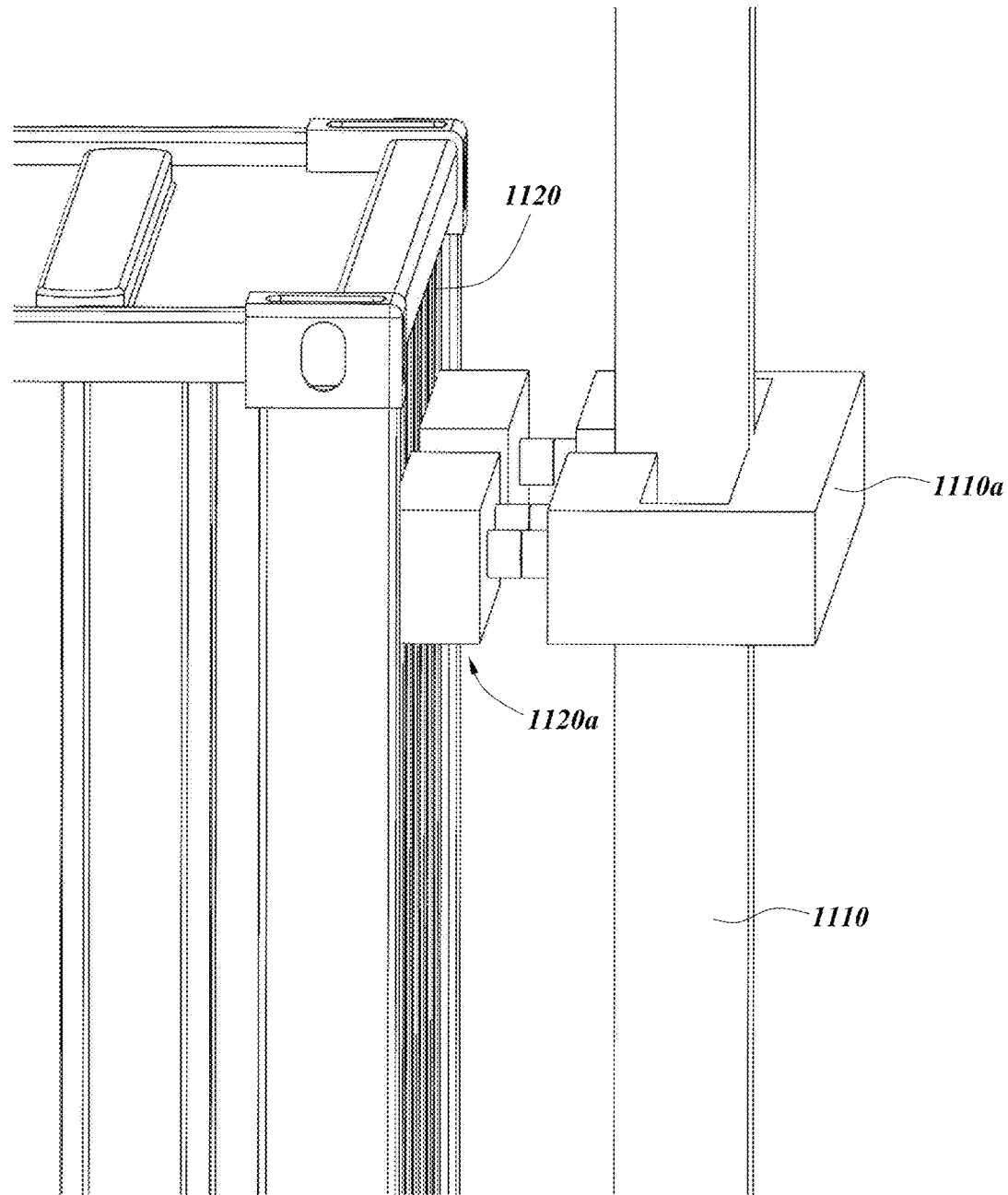

The modular mining system 1100 can include a frame 1110 configured to receive one or more containers 1120. In some cases, the frame 1110 can receive three containers 1120, as shown in FIGS. 11A-11B. The frame 1110 can receive more than or less than three containers 1120. For example, as shown in FIG. 11C, the frame 1110 can receive once container 1120. Each of the containers 1120 can be secured to the frame 1110. The containers 1120 can include a coupling member 1120a to which can be secured to a receiving member 1110a of the frame 1110. Each container 1120 can be secured to the frame 1110 by securing the coupling member 1120a to the receiving member 1110a, as shown in FIGS. 11D-11E.

In some cases, each of the containers 1120 can include equipment such as wiring connections, quick pressure fitting piping, plumbing, electrical outlets and/or fittings, etc. This can beneficially allow the containers 1120 to be in communication with each other. In some cases, the processing equipment (e.g., separators 200, system 600, etc.) can include counter slides that can match reverse slides installed on each of the containers 1120. The reverse slides installed on the containers 1120 can be installed on the floor of the containers 1120. The reverse slides can facilitate alignment of the equipment when positioning the equipment within the containers 1120. The wiring connections can be weatherproof and include quick fitting with wiring harnesses that can easily be replaced. Once the processing equipment (e.g., separators 200, system 600, etc.) is positioned and secured within a container 1120, any electrical and/or plumbing connections will be ready for use. Each container 1120 can include hydraulic equipment to facilitate the installation and/or removal of equipment from the containers 1120.

In some cases, the shipping containers of the modular mining system can include two or more systems of the same type (e.g., two systems 100). The two or more separators can be configured to operate at the same time. A maintenance schedule can be set up so that at least one of the systems continues to be operational while the other system is serviced. In some cases, and to minimize disruption to the mining operation, a malfunctioning system or scheduled-for-maintenance system can be replaced with a new or recently serviced system. The shipping containers can also be climatized. For example, in cold environments, the shipping containers can be heated to prevent water from freezing thereby ensuring that mining operations requiring water are not disrupted. In warm environments, a passive cooling system, such as a Peltier device, can be used to cool the containers and/or the equipment installed inside the container. The Peltier device can be powered using solar energy. Additionally or alternatively, aerogel can be used to insulate the shipping containers.

Beneficially, where there is a lack of roads leading to a mining site, the one or more shipping containers of the modular mining system can be transported by air if necessary. The one or more shipping containers can be delivered by transport helicopter to any location. Without roads or infrastructure of any kind, only a pre-leveled ground equal to the footprint of the one or more containers can be made to accommodate the containers. The one or more shipping containers can also be trucked, shipped, transported by train, or air-lifted to deploy a fully operational modular mining system which can also include front end loaders, slurry tanks, dump trucks, excavation machines, and all other necessary equipment that can be automated and controlled at a remote location or at a command-and-control center. The command-and-control center can be located inside one of the shipping containers. A 524-bit military grade encryption will be utilized in any of the systems of the modular mining system. In some cases, the modular mining system can include a 1024-bit encryption. In some embodiments, the modular mining system can include a multi-factor authentication system. That is, users of the modular mining system may be required to provide two or more passwords (e.g., access codes, verifications, etc.) in order to operates the modular mining system. This can beneficially prevent unauthorized users from operating the modular mining system. A perimeter fence can be set up with ground pounders so that one can be aware that people are advancing towards the location. There will also be a series of cameras that are directional and employ facial recognition. This software in these cameras will also recognize gait.

The one or more shipping containers of the modular mining system can be assembled on barges to mine rare earth minerals in very deep water or in high volume shallow waters. Magnesium modules can be used to raise such modules to the surface. The rare earth miners recovered in deep water or in high volume shallow waters can be separated using separator technology, such as system 100 and/or centrifuge 200. For example, the minerals can be processed into slurry and then separated by materials by system 100. The remaining waste materials (sand, etc.) can be dumped back into the water. Using separator technology, such as system 100 and/or centrifuge 200, barges can also be used to clean up hazardous materials in rivers, harbors, slipways, and canals.

To protect the modular mining system from trespassers and other threats, the modular mining system can include additional security mentioned. The one or more shipping containers can include password protected access points. One or more drones can include cameras, sensors, and/or microphones to detect the presence of trespassers at a mining site. The one or more drones can include audial and visual alarms to alerts of the presence of a trespasser. The one or more of drones can communicate with a remote location and/or the command-and-control center and provide real time reports of the mining operation. The drones can also be configured to transport minerals recovered by the modular mining system to a remote location. In some cases, the systems of the modular mining system can include two party authentication technology. That is, the systems of the modular mining system can be configured not to operate unless two or more pre-registered parties (system lessor and system lessee) verify their identity and/or provide an access code. Beneficially, this can prevent unauthorized people from operating the modular mining system.

Figure 12:
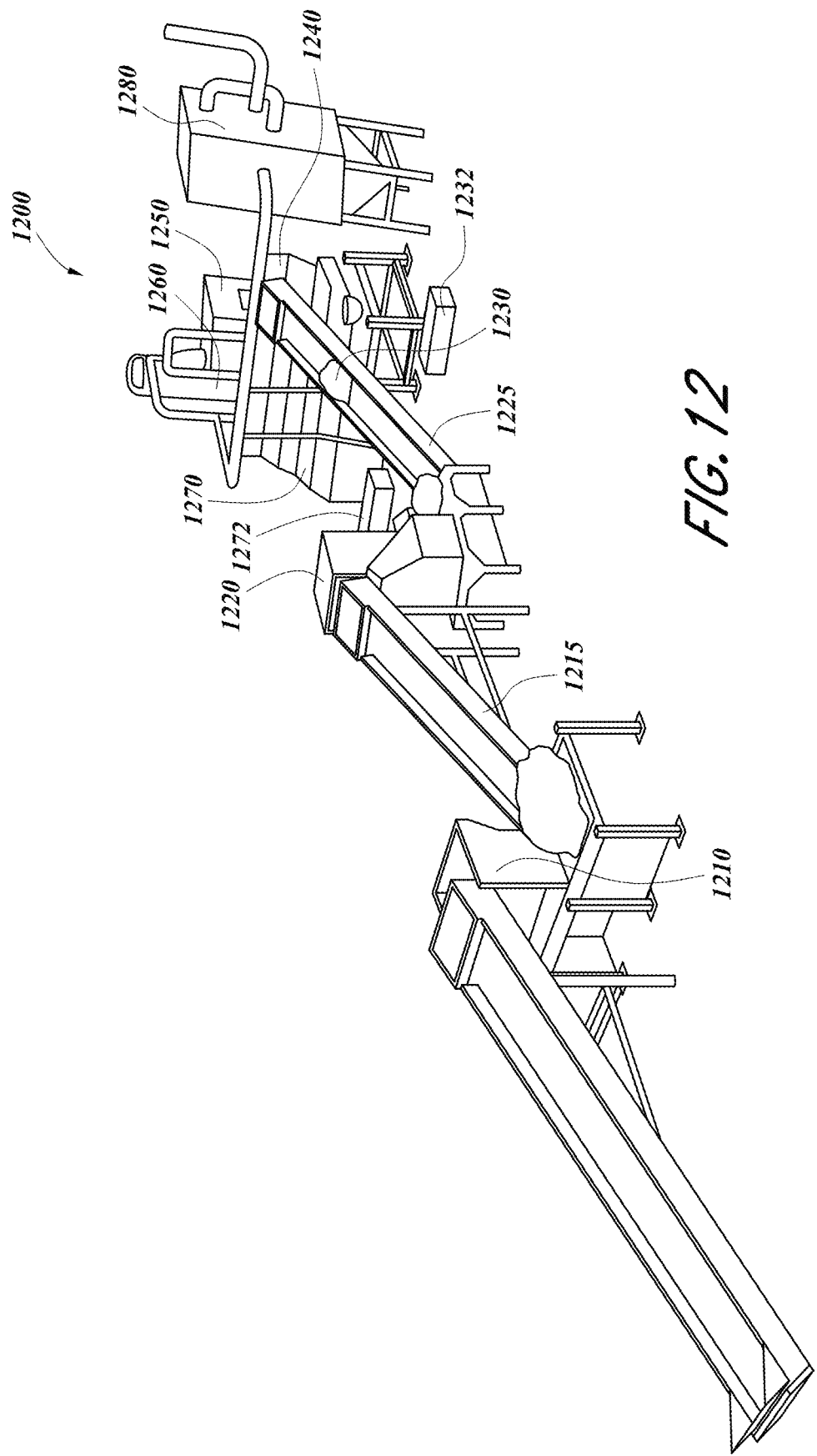
FIG. 12 shows an example embodiment of a mining system for separating minerals.

FIG. 12 shows another example of a mining system 1200 for separating minerals. The mining system 1200 can include a shredder 1210, a first crusher 1220, a magnetic separator 1230, a second crusher 1240, an electrostatic separator 1250, a vibrating screen 1260, an air separator 1270, and dust removal system 1280. The mining system 1200 can be used to extract and collect minerals contained in consumer products and/or other devices (e.g., cellphones, computers, tablets, etc.).

The shredder 1210 of the mining system 1200 can reduce the size of any consumer products and/or other devices before further processing by the other components of the mining system 1200. In some cases, the shredder 1210 can be adjusted to adjust the size of the shredded materials. Materials can be conveyed to the shredder 1210 via a belt conveyor 1205. The shredded materials can be processed by the first crusher 1220 to further reduce the size of the shredded materials. The first crusher 1220 can include a hammerhead crusher. The shredded materials can be conveyed to the first crusher 1220 via a belt conveyor 1215 positioned between the shredder 1210 and the crusher 1220. The crushed materials can be conveyed from the crusher 1220 to the second crusher 1240 via a belt conveyor 1225 positioned between the first crusher 1220 and the second crusher 1240. In some cases, the magnetic separator 1230 can be mounted to the belt conveyor 1225. The magnetic separator 1230 can separate ferrous materials from non-ferrous materials. The magnetic separator 1230 can collect the ferrous materials in a first collection zone 1232. The non-ferrous materials can be conveyed by the belt conveyor 1225 to the second crusher 1240 for further processing. In some cases, the non-ferreous materials collected by the magnetic separator 1230 can be conveyed to a centrifuge 100, a centrifuge 200, a system 600, and/or a system 800, for further processing.

The second crusher 1240 can crush the materials before further processing by the electrostatic separator 1250. In some cases, the second crusher 1240 can include a hammer crusher. The electrostatic separator 1250 can separate and classify materials of different electrical charges. In some cases, the electrostatic separator 1250 can separate materials by size. After processing by the electrostatic separator 1250, the materials can be further classified and/or separated by the vibrating screen 1260. The vibrating screen 1260 can apply vibration to separate and classify the materials (e.g., minerals) by size. The air separator 1270 can reduce or eliminate air from the processed materials. The air separator 1270 can be in fluid communication with the dust removal system 1280. The dust removal system 1280 can collect particulate matter from the air separated by the air separator and release clean air. After processing by the air separator 1270, the materials can be collected in a second collection zone 1272. In some cases, the materials collected in the second collection zone 1272 can be conveyed to a centrifuge 100, a centrifuge 200, a system 600, and/or a system 800, for further processing.

Figure 13:
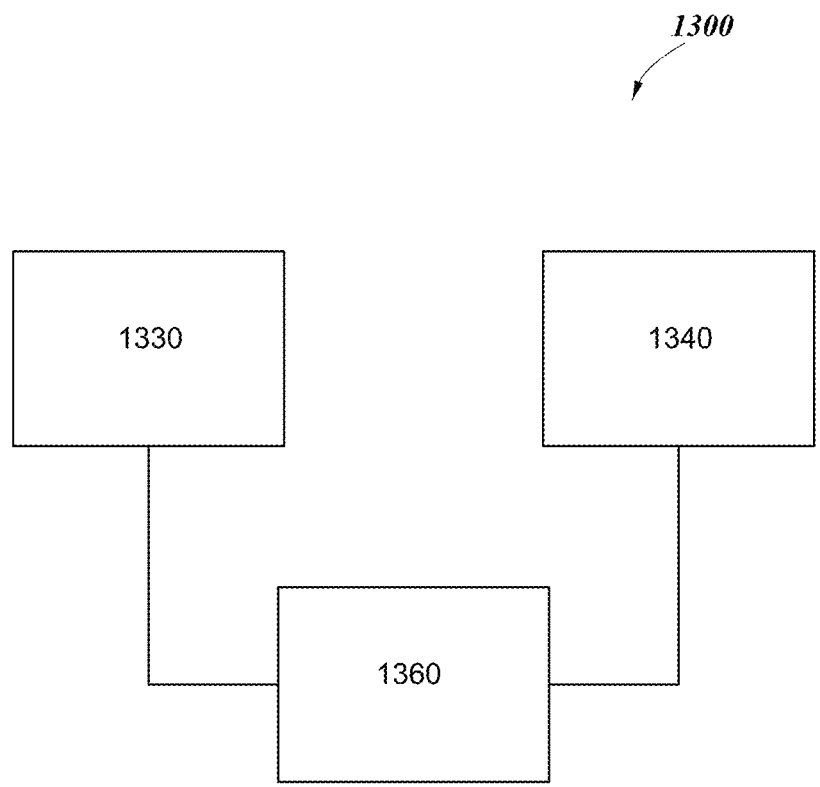
FIG. 13 shows an example embodiment of a redundancy model for a mining system.

FIG. 13 shows an example of a mining system 1300 which can include any of the systems and/or separators described herein (e.g., the system 100, separator 200, system 500, system 600, and/or a combination thereof). The mining system 1300 can include a first separator 1320 and a second separator 1340, which can be similar or identical to the separator 200. The first and second separators 1320, 1340 can yields an output 1360. Depending on the operational settings of the first and second separators 1320, 1340 and/or the materials being separated, the output 1360 can be about 1 metric ton every five minutes. The output 1360 can be more than or less than about 1 metric ton every five minutes (e.g., about 0.1, 0.2, 0.5, 1.2, 1.5 2, 5 etc. metric tons every five minutes.

In some cases, the first and second separators 1320, 1340 can be operated at less than 100% of a threshold processing rate. For instance, each of the first and second separators 1320, 1340 can be operated at a 75% threshold processing rate. Operating at less than 100% percent of the threshold processing rate can beneficially reduce malfunctions and extend the life of the first and second separators 1320, 1340. In cases where a separator fails, the other separator can be operated at an increased threshold processing rate (e.g., 150%) until the faulty separator is replaced. This can beneficially maintain the output 1360 constant until the faulty machine is replaced.

Figure 14A:
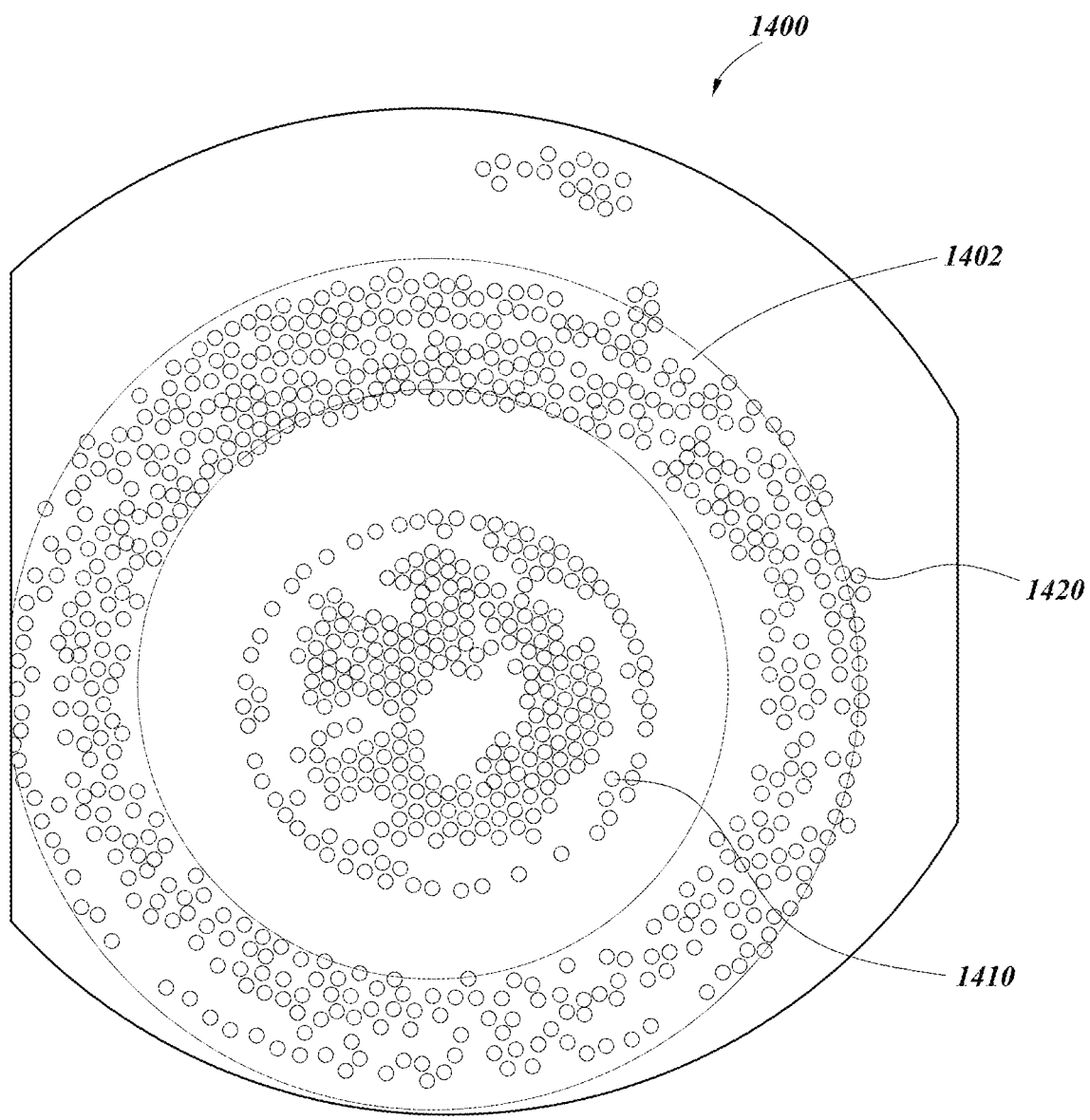
FIGS. 14A-14B show an example embodiment of a centrifuge for separating minerals according to specific gravity.
Figure 14B:
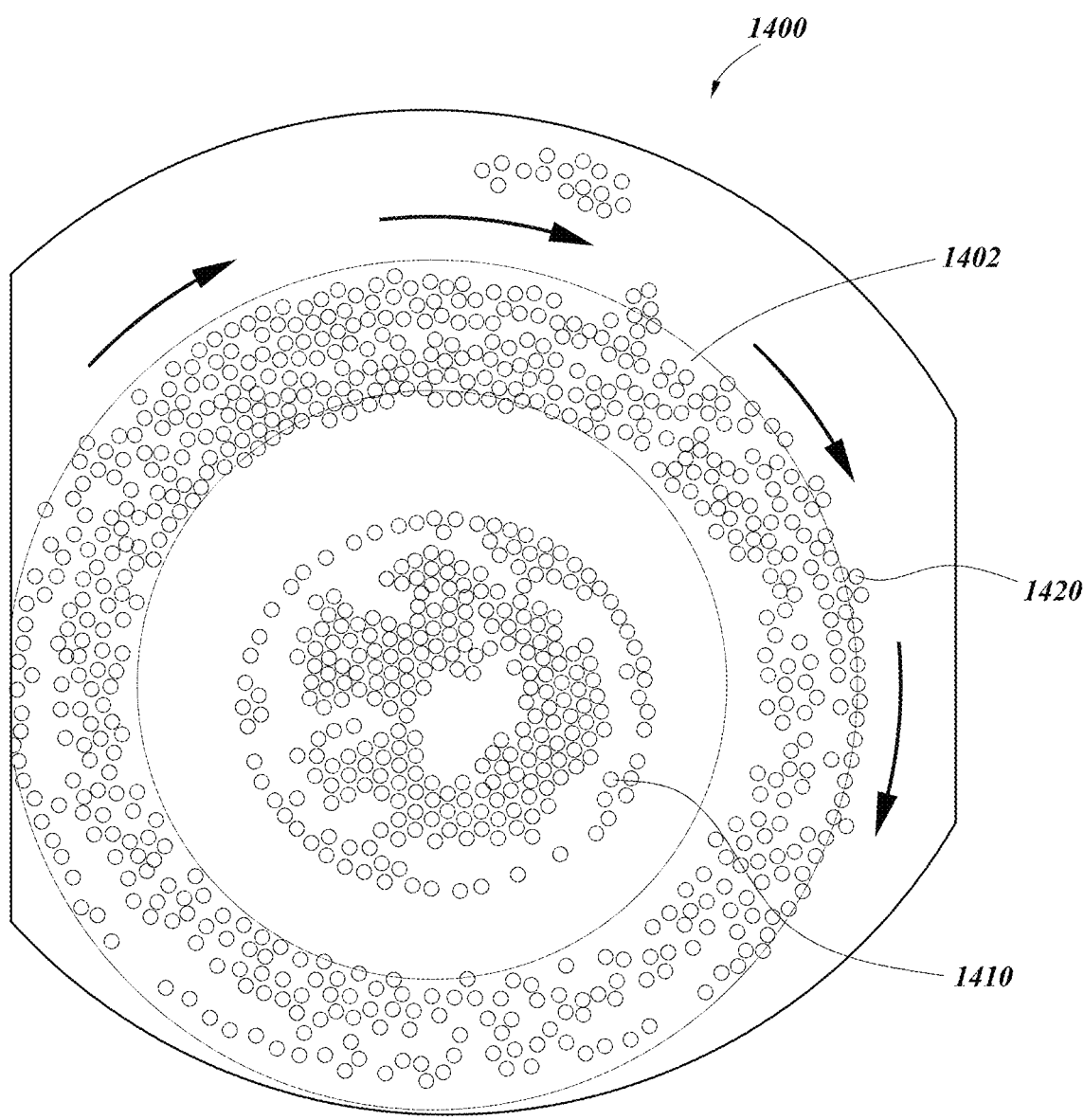

FIGS. 14A and 14B show another example of a centrifuge 1400. The centrifuge can be similar or identical in some or all aspects to the centrifuge 108 and/or the centrifuge 200. As shown in FIGS. 14A and 14B, the centrifuge 1400 can include a collection region 1402. The centrifuge 1400 may spin, as shown in FIG. 14B, to produce centripetal forces that are significantly higher than acceleration due to gravity. Minerals with a higher specific gravity, as represented by balls 1420, can collect higher along the collection region 1402 than mineral with a lower specific gravity, as represented by balls 1410.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Additionally, the words "herein," "above," and words of similar import, when used in this application, shall refer to this application as a whole and not to any particular portions of this application. Where the context permits, words in the above Detailed Description using the singular or plural number may also include the plural or singular number respectively. Where the context permits, the word "or" in reference to a list of two or more items is intended to cover all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

While certain embodiments have been described, these embodiments have been presented by way of example, and are not intended to limit the scope of the disclosure. Indeed, the novel methods, apparatus, and systems described herein may be embodied in a variety of other forms. Furthermore, various omissions, substitutions and changes in the form of the methods, apparatus, and systems described herein may be made without departing from the spirit of the disclosure. For example, device components described herein may be deleted, moved, added, subdivided, combined, and/or modified. Each of these device components may be implemented in a variety of different ways. The accompanying claims and their equivalents are intended to cover any such forms or modifications as would fall within the scope and spirit of the disclosure.

The above description is intended to be illustrative and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A system for separating a mineral from a clay using a gas injection module, the system comprising: a solution tank configured to receive a supersaturated solution including at least one mineral;
   a gas injection module in fluid communication with the solution tank and configured to receive at least a portion of the supersaturated solution;
   and at least one gas injection port in fluid communication with a source of gas and the gas injection module and configured to inject a gas to the supersaturated solution;
   wherein, during operation of the system, the gas causes at least a portion of the supersaturated solution to crystallize; and wherein a crystallized portion of the supersaturated solution comprises lithium carbonate (Li2CO3);
   further comprising an osmosis system configured to remove at least one of metal ions and aqueous salts from a non-crystallized portion of the supersaturated solution.

2. The system of claim 1, wherein the at least one mineral of the supersaturated solution includes lithium (Li).

3. The system of claim 1, further comprising a system for creating the supersaturated solution, the system comprising:
   a container configured to receive a clay containing the at least one mineral and a first fluid, wherein the clay and the first fluid are mixed to create a slurry; and
   a separator configured to receive the slurry and apply at least one of a centrifugal force, variable pitch acoustic induction, and injection of air to separate the at least one mineral from the slurry;
   wherein the separated mineral is mixed with a second fluid to create the supersaturated solution.

4. The system of claim 3, wherein:
   the clay comprises a raw Zeolite clay containing lithium;
   the first and second fluids include water; and
   the supersaturated solution includes about 45 g of lithium for about every 5.67 liters of the second fluid.

5. The system of claim 1, further comprising a recirculation line in fluid communication with the gas injection module and the at least one injection port, the recirculation line configured to recirculate at least a portion of the gas from inside the gas injection module to the at least one injection port.

6. The system of claim 1, further comprising at least one of a pH indicator and a pH meter to verify a pH level of the supersaturated solution.

7. The system of claim 1, further comprising a collection region disposed inside the gas injection module and configured to collect a crystallized portion of the supersaturated solution.

8. The system of claim 1, wherein the gas comprises at least one of carbon dioxide ($CO_2$) and compressed air.

9. A system for separating minerals, the system comprising:
   a shredder configured to receive and shred a material;
   a first crusher configured to receive the shredded material from the shredder and crush the shredded material;
   a magnetic separator configured to separate ferreous materials from non-ferrous materials contained in the crushed materials;
   a second crusher configured to receive the non-ferrous materials and crush the non-ferrous materials;
   an electrostatic separator configured to receive the materials from the second crusher and separate the materials by a first electrical charge and a second electrical charge; and
   a vibrating screen configured to receive the separated materials from the electrostatic separator and apply vibration to classify the separated materials by a particle size.

10. The system of claim 9, wherein the material contains at least one of nickel, manganese, cobalt, and lithium.

11. The system of claim 9, further comprising an air separator and a dust removal system, wherein the air separator is configured to remove air from the material, and wherein the dust removal system is configured to collect particulate matter from the air separated by the air separator.

12. The system of claim 9, further comprising a centrifuge, the centrifuge configured to receive the ferreous materials and separate the ferreous materials according to specific gravity.

13. The system of claim 9, further comprising a centrifuge, the centrifuge configured to receive an output of the vibrating screen and separate the output according to specific gravity.

14. A system for separating minerals, the system comprising:
   a shredder configured to receive and shred a material;
   a crusher configured to receive the shredded material from the shredder and crush the shredded material;
   a magnetic separator configured to separate ferreous materials from non-ferrous materials contained in the crushed materials;

an electrostatic separator configured to receive the non-ferrous materials and separate the non-ferrous materials by a first electrical charge and a second electrical charge; and a screen configured to receive the separated materials from the electrostatic separator and apply vibration to classify the separated materials by a particle size.

15. The system of claim 14, wherein the material contains at least one of nickel, manganese, cobalt, and lithium.

16. The system of claim 14, further comprising an air separator and a dust removal system, wherein the air separator is configured to remove air from the material, and wherein the dust removal system is configured to collect particulate matter from the air separated by the air separator.

17. The system of claim 14, further comprising a centrifuge, the centrifuge configured to receive the ferreous materials and separate the ferreous materials according to specific gravity.

18. The system of claim 14, further comprising a centrifuge, the centrifuge configured to receive an output of the screen and separate the output according to specific gravity.

* * * * *